(12) United States Patent
Horie et al.

(10) Patent No.: US 9,600,095 B2
(45) Date of Patent: Mar. 21, 2017

(54) POSITION INDICATOR

(71) Applicant: Wacom Co., Ltd., Saitama (JP)

(72) Inventors: Toshihiko Horie, Saitama (JP); Ryoji Kamiyama, Ibaraki (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/648,233

(22) PCT Filed: May 20, 2014

(86) PCT No.: PCT/JP2014/063293
§ 371 (c)(1),
(2) Date: May 28, 2015

(87) PCT Pub. No.: WO2014/208219
PCT Pub. Date: Dec. 31, 2014

(65) Prior Publication Data
US 2016/0162049 A1 Jun. 9, 2016

(30) Foreign Application Priority Data
Jun. 27, 2013 (JP) .................................. 2013-134721

(51) Int. Cl.
G06F 3/033 (2013.01)
G06F 3/0354 (2013.01)
(Continued)

(52) U.S. Cl.
CPC ............ *G06F 3/03545* (2013.01); *G06F 3/03* (2013.01); *G06F 3/046* (2013.01); *G06F 3/0414* (2013.01); *G06F 2203/04103* (2013.01)

(58) Field of Classification Search
None
See application file for complete search history.

(56) References Cited

U.S. PATENT DOCUMENTS 5,854,881 A 12/1998 Yoshida et al.
7,149,647 B2 12/2006 Katsurahira
(Continued)

FOREIGN PATENT DOCUMENTS

CN 102623135 A 8/2012
JP 08-50535 A 2/1996
(Continued)

OTHER PUBLICATIONS

International Search Report dated Jul. 8, 2014, for corresponding International Application No. PCT/JP2014/063293, 4 pages.

*Primary Examiner* — Adam R Giesy
(74) *Attorney, Agent, or Firm* — Seed Intellectual Property Law Group LLP

(57) ABSTRACT

A position indicator includes a columnar magnetic core provided within a cylindrical casing with an axial direction of the casing as a direction of a central axis of the magnetic core. A coil is wound so as to have the central axis of the columnar magnetic core as a center. A core body is provided so as to have a tip portion exposed to an outside from an opening formed on one end side in the axial direction of the cylindrical casing. The magnetic core has a flat cross-sectional shape, and has a tapered portion formed on a side of the tip portion of the core body in the direction of the central axis of the magnetic core, the tapered portion being tapered off toward the tip portion of the core body.

16 Claims, 10 Drawing Sheets

(51) Int. Cl.
*G06F 3/03* (2006.01)
*G06F 3/046* (2006.01)
*G06F 3/041* (2006.01)

(56) References Cited

U.S. PATENT DOCUMENTS

| | | |
|---|---|---|
| 8,304,671 B2 | 11/2012 | Fukushima et al. |
| 8,913,041 B2 | 12/2014 | Fukushima et al. |
| 2002/0070927 A1 | 6/2002 | Fujitsuka et al. |
| 2005/0043918 A1 | 2/2005 | Katsurahira et al. |
| 2006/0030393 A1 | 2/2006 | Seelig et al. |
| 2008/0180092 A1 | 7/2008 | Fukushima et al. |
| 2008/0203824 A1 | 8/2008 | Koyama |
| 2009/0084614 A1 | 4/2009 | Fukushima et al. |
| 2011/0219892 A1 | 9/2011 | Fukushima et al. |
| 2012/0068975 A1* | 3/2012 | Wei .................. G06F 3/046 345/179 |
| 2013/0199311 A1* | 8/2013 | Horie .................. G01L 1/142 73/862.626 |

FOREIGN PATENT DOCUMENTS

| | | |
|---|---|---|
| JP | 2003-345501 A | 12/2003 |
| JP | 2004-151805 A | 5/2004 |
| JP | 2005-010844 A | 1/2005 |
| JP | 2007-164356 A | 6/2007 |
| JP | 2008-243182 A | 10/2008 |
| JP | 2009-086925 A | 4/2009 |
| JP | 2010-129920 A | 6/2010 |
| JP | 2011-186803 A | 9/2011 |

\* cited by examiner

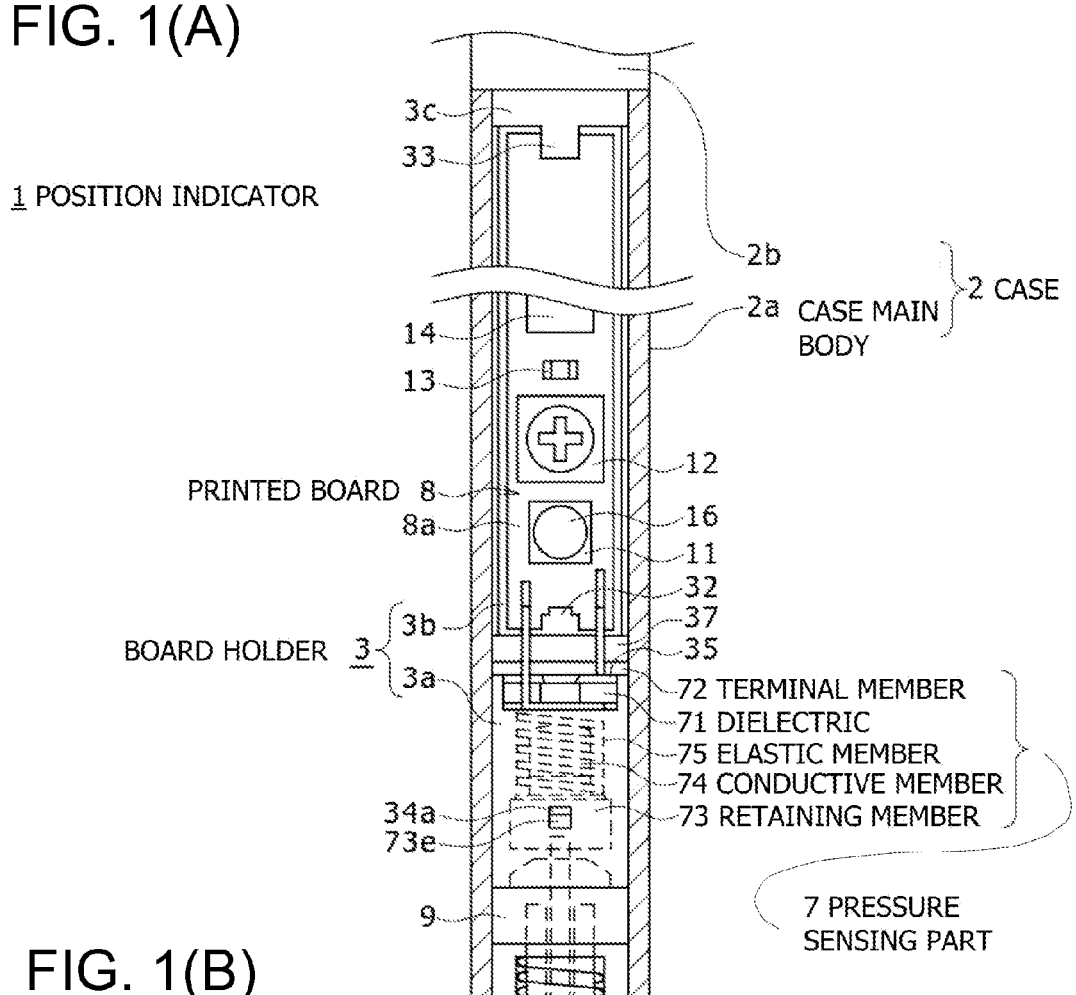
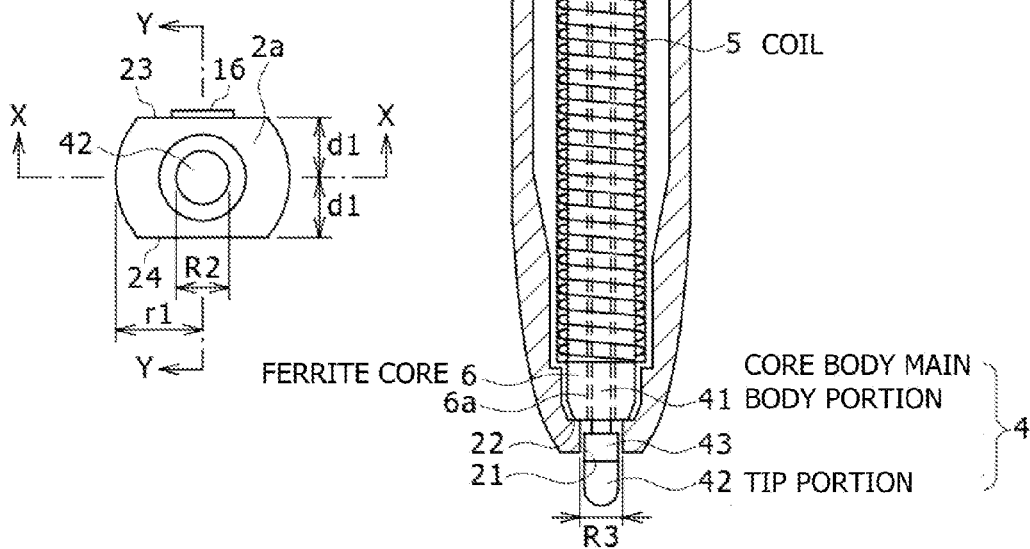

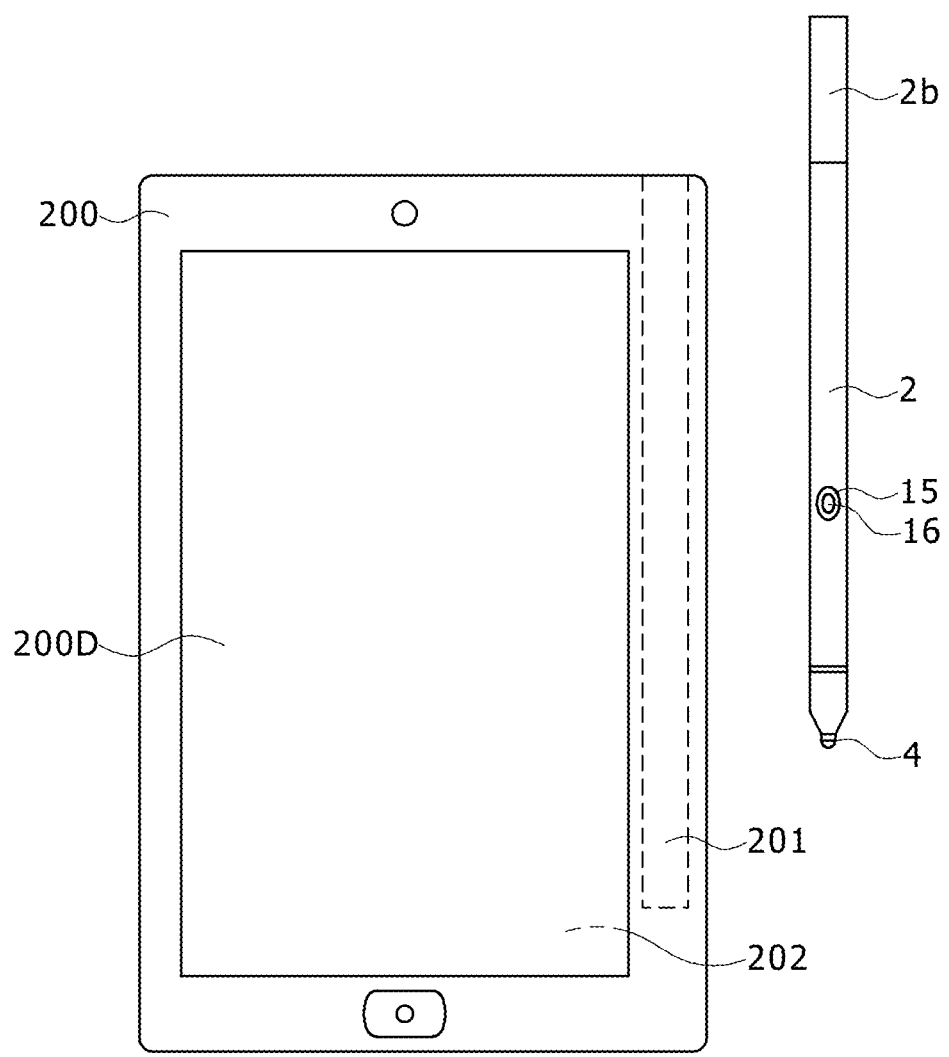

SECTIONAL VIEW TAKEN ALONG X-X

SECTIONAL VIEW TAKEN ALONG Y-Y

SECTIONAL VIEW TAKEN ALONG LINE D-D

SECTIONAL VIEW TAKEN ALONG LINE E-E

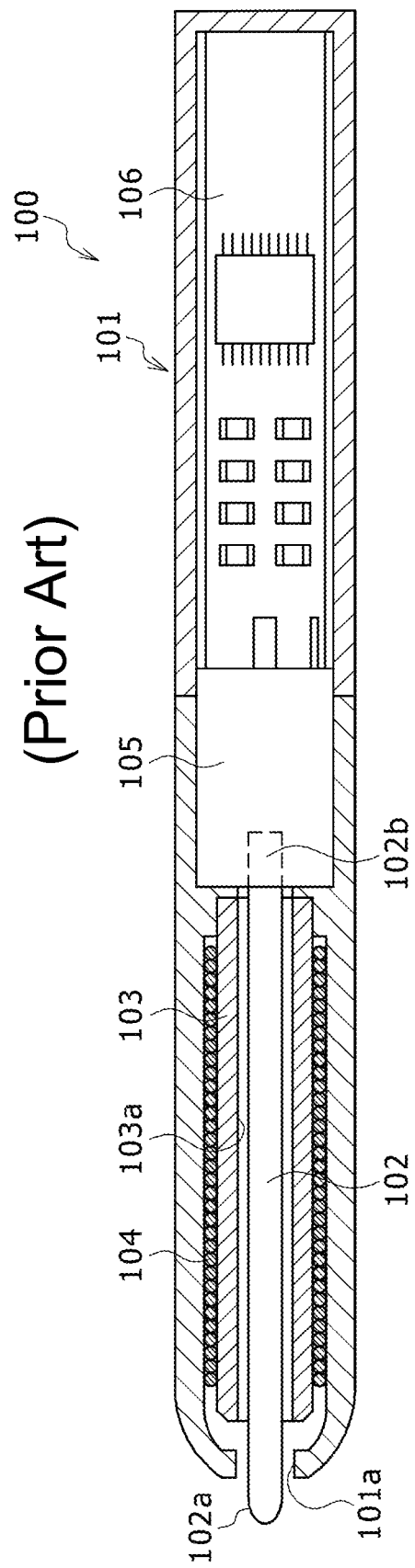
FIG. 12A(A) (Prior Art)
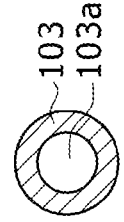
FIG. 12(B) (Prior Art)

POSITION INDICATOR

TECHNICAL FIELD

The present invention relates to an electromagnetic induction type position indicator in the shape of a pen, for example, which position indicator is used in conjunction with a position detecting device, and particularly to the constitution of a magnetic core wound with a coil.

BACKGROUND ART

A position input device has recently been used as an input device for a tablet type PC (personal computer) or the like. This position input device includes for example a position indicator formed in the shape of a pen and a position detecting device having an input surface on which pointing operations and the input of characters, figures, and the like are performed by using the position indicator.

In related art, as a pen type position indicator of this kind, a position indicator for an electromagnetic induction type position detecting device is well known. The electromagnetic induction type position indicator has a resonance circuit formed by connecting a capacitor for resonance to a coil wound around a ferrite core as an example of a magnetic core. The position indicator indicates a position on the position detecting device by transmitting and receiving a resonance signal obtained in the resonance circuit to and from a sensor of the position detecting device.

The pen type position indicator of this kind in related art is also configured to have a function of detecting a pressure (pen pressure) applied to a tip portion (pen point) of a core body and transmitting the pressure (pen pressure) to the position detecting device. In this case, for detecting the pen pressure, a method is known which uses a mechanism that changes the capacitance of the capacitor forming the resonance circuit or the inductance of the coil forming the resonance circuit according to the pen pressure.

FIGS. 12(A) and 12(B) show an example of a constitution in related art of a position indicator that includes a pen pressure detecting module of a variable capacitance capacitor type that changes the capacitance of a capacitor forming a resonance circuit of the position indicator according to pen pressure. The example is described in Patent Document 1 (Japanese Patent Laid-Open No. 2011-186803). FIG. 12(A) is a longitudinal sectional view of assistance in explaining the example of constitution of the position indicator.

As shown in FIG. 12(A), a position indicator 100 includes, within a cylindrical casing (case) 101, a core body 102, a position indicating coil 104 wound around a ferrite core 103 having a cylindrical shape, a variable capacitance capacitor 105, and a printed board 106.

The casing 101 is of a cylindrical shape having an opening portion 101a on one end side in an axial direction and closed on another end side in the axial direction. The printed board 106 having electronic parts mounted thereon is fixed close to the other end side in the axial direction within a cylindrical hollow portion of the casing 101 by fastening means such as an adhesive, a fixing screw, or the like. The ferrite core 103 is housed close to the one end side where the opening portion 101a of the casing 101 is formed.

As shown in FIG. 12(B), the ferrite core 103 is for example of a cylindrical shape having a through hole 103a in the axial direction at the position of the central axis of a circular cylinder having a perfectly round cross section. The position indicating coil 104 forming the resonance circuit is mounted in a state of being wound around the outer circumference of the ferrite core 103. Both ends, which are not shown in the figures, of the position indicating coil 104 are electrically connected to electronic parts forming the resonance circuit which electronic parts are mounted on the printed board 106. The core body 102 is inserted through the through hole 103a of the ferrite core 103.

The core body 102 is formed by a rod-shaped member having a substantially uniform thickness (diameter). The core body 102 is made of an elastic material so as not to damage an input surface formed by a glass surface or the like. One end in the axial direction of the core body 102 is a tip portion 102a having a role of a pen point. The tip portion 102a in the example of FIG. 12(A) is formed in substantially the shape of a circular cone. The tip portion 102a is projected so as to be exposed from the opening portion 101a to the outside when the core body 102 is inserted through the through hole 103a of the ferrite core 103 and housed within the casing 101. In addition, another end 102b in the axial direction of the core body 102 is coupled to the variable capacitance capacitor 105.

Though not shown in detail in FIG. 12(A), when a pressure in the axial direction is applied to the tip portion 102a of the core body 102, the variable capacitance capacitor 105 exhibits a capacitance corresponding to the pressure. That is, the variable capacitance capacitor 105 exhibits a capacitance corresponding to the pressure applied to the core body 102. Because the variable capacitance capacitor 105 forms part of the resonance circuit, the pen pressure applied to the core body 102 of the position indicator 100 can be detected on the side of the position detecting device by transmitting the resonance frequency of the resonance circuit from the position indicator 100 to the side of the position detecting device.

PRIOR ART DOCUMENT

Patent Document
    Patent Document 1: Japanese Patent Laid-Open No. 2011-186803

SUMMARY OF INVENTION

Technical Problems

The position indicator has the coil wound around the magnetic core, as described above. The coil is wound in a circular shape for reasons that writing instruments are often in the shape of a rod having a circular cross section, a magnetic flux is desirably received or sent out uniformly, and a work process of winding the coil is easy, for example. The magnetic core used in the position indicator is therefore of a cylindrical shape having a perfectly round cross section.

There has recently been an increasing number of miniaturized portable terminals that incorporate position detecting devices, such as advanced portable telephone terminals referred to as smart phones, for example. In a case where an electromagnetic induction type position detecting device is used, many portable terminals detachably house a position indicator used in conjunction with the position detecting device within the casings of the portable terminals. When a position indicator is thus housed in a portable terminal, the shape of the position indicator is desired to be thin so as to correspond to a reduction in thickness of the casing of the small portable terminal.

In order to thin the position indicator, a magnetic core wound with a coil housed within a cylindrical casing needs to be thinned. That is, the diameter of the magnetic core having a perfectly round cross section needs to be reduced. However, the cross-sectional area of the magnetic core is decreased in proportion to the square of the radius of the magnetic core. The coil is wound in close contact with the magnetic core. Thus, the cross-sectional area of the coil is substantially equal to the cross-sectional area of the magnetic core.

When the electromagnetic induction type position indicator receives a signal from a sensor of the position detecting device, the position indicator receives the signal in the coil wound around the magnetic core as an induced current induced according to a change in the number of magnetic fluxes interlinked with the coil. However, as the cross-sectional area of the coil is reduced, the magnitude of the induced current is decreased. The position indicator thus may not be able to receive the signal from the sensor of the position detecting device. Therefore, there is a limit to the thinning of the casing of the position indicator when the magnetic core of the cylindrical shape having the perfectly round cross section in related art is used.

In addition, when a through hole for inserting the core body is provided at the position of the central axis of the magnetic core as in the example in related art in FIGS. 12(A) and 12(B), the material thickness of the cylindrical magnetic core is reduced. Thus, when the position indicator falls, the magnetic core tends to be damaged by a stress applied to the casing of the position indicator due to an impact of the falling of the position indicator.

An object of the present invention is to provide a position indicator that can solve the above problems.

Technical Solution

In order to solve the above problems, according to the present invention, there is provided a position indicator including: a cylindrical casing; a columnar magnetic core provided within the cylindrical casing with an axial direction of the casing as a direction of a central axis of the magnetic core; a coil wound so as to have the central axis of the columnar magnetic core as a center; and a core body provided so as to have a tip portion exposed to an outside from an opening formed on one end side in the axial direction of the cylindrical casing, wherein the magnetic core has a flat cross-sectional shape, and has a tapered portion formed on a side of the tip portion of the core body in the direction of the central axis of the magnetic core, the tapered portion being tapered off toward the tip portion of the core body.

The magnetic core of the position indicator according to the invention of claim 1 which position indicator has the above-described constitution has a columnar shape and has a flat cross-sectional shape. The coil is wound around the magnetic core. Hence, provisions can be made for a reduction in thickness of a portable terminal housing the position indicator by making the casing of the position indicator also have a flat cross-sectional shape corresponding to the magnetic core.

In this case, the position indicator is housed in a thin portable terminal easily by shortening a length in a shorter side in the flat cross-sectional shape of the magnetic core as much as possible, and making the casing have a correspondingly flat shape.

As compared with a magnetic core having a perfectly round cross section with a same radius as the length in the shorter side in the flat cross-sectional shape of the magnetic core, the magnetic core of the position indicator according to the present invention has a flat shape and is thus correspondingly increased in cross-sectional area. The number of magnetic fluxes interlinked with the coil is correspondingly increased, so that degradation in signals transmitted and received between a sensor of a position detecting device and the position indicator according to the present invention can be prevented.

In addition, the magnetic core of the position indicator according to the present invention has the tapered portion formed at an end portion of the magnetic core which end portion is on the side of the core body involved in the transmission and reception of the signals. Thus, a magnetic flux exchanged between the position indicator and the sensor of the position detecting device can be concentrated on a cross-sectional part narrowed by the tapered portion. Therefore, the sensor can excellently detect a position indicated by the position indicator, and also have an excellent pen pressure detecting characteristic.

The magnetic core of the position indicator according to the present invention has a flat cross section. A length of a shorter side of the cross-sectional shape is limited so that the position indicator is housed in a thin portable terminal, but a length in a longitudinal direction of the cross-sectional shape is not limited. Thus, even when a through hole is formed at the central axis of the magnetic core, a material thickness in the longitudinal direction in which the length is not limited is increased as compared with the case of the perfectly round cross section. Thus, it is possible to make the magnetic core resistant to damage when the position indicator falls.

Advantageous Effects

According to the present invention, the cross section of the magnetic core in the columnar shape which magnetic core is housed in the position indicator has a flat shape, whereby the thinning of the casing of the position indicator can be realized while degradation in signals transmitted and received to and from the sensor of the position detecting device is prevented.

In addition, the magnetic core has the tapered portion formed at an end portion of the magnetic core which end portion is on the side of the core body involved in the transmission and reception of the signals. Thus, a magnetic flux exchanged between the position indicator and the sensor of the position detecting device can be concentrated on an end part narrowed by the tapered portion. Therefore, the sensor of the position detecting device can excellently detect a position indicated by the position indicator, and also have an excellent pen pressure detecting characteristic.

Further, because the cross section of the magnetic core has a flat shape, even when a through hole for inserting the core body is provided at the position of the central axis of the magnetic core, the magnetic core can be made resistant to damage caused by a stress applied to the casing of the position indicator due to an impact when the position indicator falls.

BRIEF DESCRIPTION OF DRAWINGS

FIG. 1(A) is a sectional view of a first embodiment of a position indicator according to the present disclosure; and FIG. 1(B) is bottom plan view of the position indicator.

FIG. 2 is a diagram showing an embodiment of a position indicator according to the present disclosure and an example of an electronic device including a position detecting device used in conjunction with the position indicator.

FIGS. 12(A) and 12(B) are sectional views of a position indicator in related art.

MODES FOR CARRYING OUT THE INVENTION

Figure 3B:
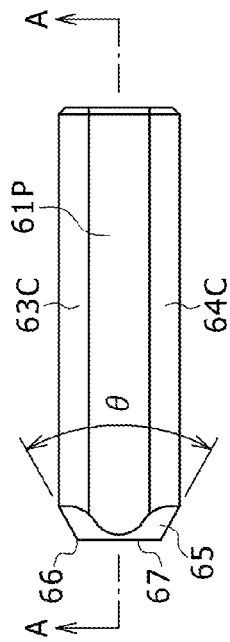
FIG. 3(B) is a top plan view of the ferrite core.

A few embodiments of a position indicator according to the present invention will hereinafter be described with reference to the drawings.

[First Embodiment]

FIG. 1 to FIG. 4 are diagrams of assistance in explaining an example of constitution of a first embodiment of a position indicator according to the present disclosure. FIG. 2 shows an example of an electronic device 200 using the position indicator 1 according to the first embodiment. In the present example, the electronic device 200 is an advanced portable telephone terminal having a display screen 200D of a display device such as an LCD (liquid crystal display), and includes a position detecting device 202 of an electromagnetic induction type under (on the back side of) the display screen 200D.

A casing of the electronic device 200 in the present example has a housing recessed hole 201 housing the position indicator 1 in the shape of a pen. As required, a user extracts the position indicator 1 housed in the housing recessed hole 201 from the electronic device 200, and performs a position indicating operation with the display screen 200D as an input surface.

In the electronic device 200, when the position indicating operation is performed on the display screen 200D by the pen-shaped position indicator 1, the position detecting device 202 provided on the back side of the display screen 200D detects a position operated by the position indicator 1 and a pen pressure, and a microcomputer included in the position detecting device 202 of the electronic device 200 performs display processing according to the operated position on the display screen 200D and the pen pressure.

FIGS. 1(A) and 1(B) schematically show the whole of the position indicator 1 according to the first embodiment. FIG. 1(A) shows the inside of a case main body 2a of a case 2 (casing) of the position indicator 1 with only the case main body 2a cut away for purposes of illustration. FIG. 1(B) is a view of the position indicator 1 according to the first embodiment as viewed in an axial direction from the side of a core body 4.

As shown in FIG. 1(A), the position indicator 1 has the case 2 forming a bottomed cylindrical casing elongated in the axial direction, opened on one side in the axial direction, and closed on another side in the axial direction. This case 2 is formed of a resin, for example. The case 2 includes the case main body 2a of a cylindrical shape having a hollow portion therewithin and a case cap 2b coupled to the case main body 2a.

In the present embodiment, an external shape of the case main body 2a in a direction orthogonal to a central axis of the case main body 2a (which external shape is equal to the contour shape of a cross section of the case main body 2a) is a flat shape as shown in FIG. 1(B). The external shape in the example shown in FIG. 1(B) is equal to a shape obtained by cutting and removing side surfaces of a circular cylinder having a circular cross section of a radius r1 by planes parallel to each other which planes are at positions distant from the central axis of the circular cylinder by a distance d1 shorter than the radius r1. Hence, as shown in FIG. 1(B), the external shape of the case main body 2a in the direction orthogonal to the central axis of the case main body 2a has two straight lines 23 and 24 parallel to each other (corresponding to the positions of the planes parallel to each other) which straight lines 23 and 24 are opposed to each other with the central axis interposed therebetween. The hollow portion inside the case main body 2a also has a flat cross-sectional shape corresponding to the external shape of the case main body 2a.

A core body 4 and a magnetic core wound with a coil 5, which magnetic core is a ferrite core 6 in the present example, are coupled with each other and housed in a board holder 3 within the hollow portion of the case main body 2a. The core body 4 includes a core body main body portion 41 formed by an elongate rod-shaped body and a tip portion 42 formed on one end side in the axial direction of the core body main body portion 41. The tip portion 42 of the core body 4 is projected and exposed to the outside through an opening portion 21 formed at one end portion in the axial direction of the case main body 2a which end portion forms a pen point of the case main body 2a.

The ferrite core 6 in the present example has a columnar shape with a through hole 6a of a diameter R1 slightly larger than a diameter R0 of the core body main body portion 41 at the position of the central axis for insertion of the core body main body portion 41 of the core body 4. The ferrite core 6 in the present embodiment is formed so as to have a flat cross-sectional shape corresponding to the cross-sectional shape of the hollow portion of the case main body 2a.

Figure 3F:
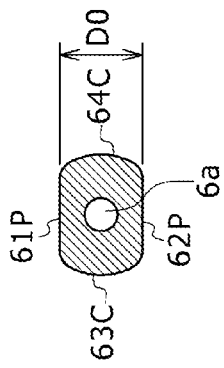
FIG. 3(F) is a sectional view taken along a line B-B of FIG. 3(C) of the ferrite core.
Figure 3A:
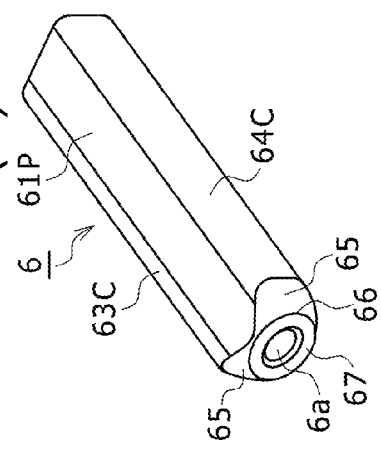
FIG. 3(A) is a perspective view of an example ferrite core that may be used as a principal part of the first embodiment of the position indicator according to the present disclosure.
Figure 3C:
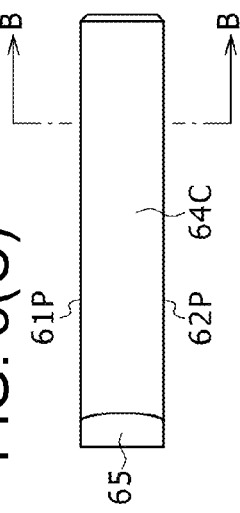
FIG. 3(C) is a side plan view of the ferrite core.
Figure 3E:
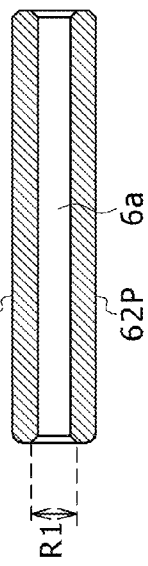
FIG. 3(E) is a sectional view taken along a line A-A of FIG. 3(B) of the ferrite core.
Figure 3D:
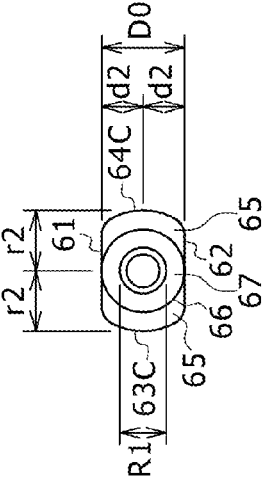
FIG. 3(D) is a bottom plan view of the ferrite core.

FIGS. 3(A)-3(E) show an example of constitution of the ferrite core 6 of the position indicator 1 according to the present embodiment. FIG. 3(A) is a perspective view of the ferrite core 6 in the present example. FIG. 3(B) is a top view of the ferrite core 6 in the present example as viewed from a direction orthogonal to the two straight lines 23 and 24 of the external shape of the case main body 2a when the ferrite core 6 is housed within the case main body 2a. FIG. 3(C) is a side view of the ferrite core 6 in the present example as viewed from a direction parallel to the two straight lines 23 and 24 of the external shape of the case main body 2a when the ferrite core 6 is housed within the case main body 2a. FIG. 3(D) is a view of the ferrite core 6 in the present example as viewed from the side of the core body 4 in the axial direction. FIG. 3(E) is a sectional view taken along a line A-A of FIG. 3(B) (longitudinal sectional view of the ferrite core 6). FIG. 3(F) is a sectional view taken along a line B-B of FIG. 3(C) (cross-sectional view of the ferrite core 6).

In the present embodiment, the ferrite core 6 has the columnar shape, and has the through hole 6a of the diameter R1 at the position of the central axis. An external shape of the ferrite core 6 in a direction orthogonal to a central axis of the ferrite core 6 is a flat shape corresponding to the contour shape of the cross section of the case main body 2a as shown in FIG. 3(D). Specifically, the ferrite core 6 has a shape equal to a shape obtained by cutting and removing side surface portions of a circular cylinder having a circular cross section of a radius r2 by planes in the axial direction which planes respectively include two positions at a distance d2 (d2<r2) shorter than the radius r2 from the central axis of the circular cylinder and which positions are opposed to each other with the central axis of the circular cylinder interposed therebetween (planes including straight lines 61 and 62 in FIG. 3(D) and FIG. 3(F)).

Hence, the columnar ferrite core 6 has a shape in which planes 61P and 62P parallel to each other with the central axis interposed therebetween are included in side surface portions and the two parallel planes 61P and 62P are coupled to each other by curved surfaces 63C and 64C. The presence of the curved surfaces 63C and 64C enables the wire of the coil 5 to be wound in close contact with the external surface of the ferrite core 6 even when the ferrite core 6 has a flat shape.

Specifically, when there is a gap between the external surface of the ferrite core 6 and the wire of the coil 5 wound around the ferrite core 6, the following problems occur, for example.
(1) Because permeability is decreased by an amount corresponding to the created gap, a current induced according to a magnetic flux interlinked with the coil 5 does not occur easily.
(2) The adhesion of water to the created gap causes changes in characteristics, and changes permeability.
(3) Because of the gap, the cross-sectional shape of the coil tends to change, and permeability changes.

On the other hand, the curved surfaces 63C and 64C of the ferrite core 6 according to the present embodiment improve the adhesion of the wire of the coil 5 to the external surface of the ferrite core 6, and can thus alleviate problems as described above.

Incidentally, the curved surfaces 63C and 64C do not need to be part of an arc as in the above-described example, but may be for example part of an ellipse or another arbitrary curved surface. In addition, the curved surfaces 63C and 64C may not be a curved surface but may include a plurality of angular portions in the shape of a polygonal line. However, it is desirable that the distance from the central axis of the ferrite core 6 to the curved surfaces be always larger than the distance from the central axis to the planes 61P and 62P.

A distance D0 (=2×d2) between the two parallel planes 61P and 62P of the ferrite core 6 is selected to be a value such that a distance (2×d1) between the two straight lines 23 and 24 of the case main body 2a housing the ferrite core 6 in the hollow portion thereof is shorter than the length in a direction of thickness of the housing recessed hole 201 set according to the thickness of the electronic device 200 in FIG. 2.

On the other hand, the length of the ferrite core 6 in a longitudinal direction along the planes 61P and 62P in the cross section of the ferrite core 6 is not limited by the thickness of the electronic device 200, but is selected to be a length in consideration of the ease of holding of the position indicator 1, the ease of use of the position indicator 1, and the strength of the ferrite core 6 and in accordance with the size of the housing recessed hole 201 of the electronic device 200.

In the present embodiment, an end portion in the axial direction of the ferrite core 6 which end portion is on the side of the tip portion 42 of the core body 4 when the core body 4 is inserted in the through hole 6a has tapered portions 65 formed so as to taper off toward the side of the tip portion 42 of the core body 4.

In the present embodiment, as shown in FIG. 3(D), an annular flat surface 67 having a diameter larger than the diameter R1 of the through hole 6a and formed between the through hole 6a and an outer circumferential circle 66 concentric with the through hole 6a is formed on an end surface in the axial direction of the ferrite core 6 which end surface is on the side of the tip portion 42 of the core body 4. This annular flat surface 67 is a flat surface (end surface) in a direction orthogonal to the direction of the central axis of the ferrite core 6.

As shown in FIG. 3(B), the tapered portions 65 have inclined surfaces extending linearly at a predetermined angle from side circumferential surfaces of the columnar ferrite core 6 to the outer circumferential circle of the annular flat surface 67. The inclined surfaces of the tapered portions 65 in the present example are formed such that extending directions of ridges of the inclined surfaces of the tapered portions 65 concentrate on the position of the central axis of the ferrite core 6. Hence, the tapered portions 65 are part of the peripheral side surface of a circular cone and form inclined surfaces according to a vertex angle θ of the circular cone. The vertex angle θ in the present example is for example 60 degrees.

In the present embodiment, as shown in FIG. 3(D), the radius of the outer circumferential circle 66 of the annular flat surface 67 is substantially equal to the distance d2. The tapered portions 65 in the present embodiment are therefore formed so as to extend from the curved surfaces 63C and 64C to the outer circumferential circle of the annular flat surface 67. That is, the tapered portions 65 in the present example are formed only in the longitudinal direction in the cross-sectional direction of the ferrite core 6.

When the ferrite core has a flat shape, the end surface of the ferrite core expands laterally, so that a magnetic flux may be concentrated on the tip portion 42 of the core body 4 less easily than in a case of a perfectly round end surface in the past. However, in the case of the ferrite core 6 in the present example, the end portion on the side of the tip portion 42 of the core body 4 has the tapered portions 65, and the tapered portions 65 are formed so as to terminate at the annular flat surface 67. Thus, the magnetic flux can be concentrated on the annular flat surface 67, and in turn the magnetic flux can be concentrated on the tip portion 42 of the core body 4. That is, in the ferrite core 6 according to the present embodiment, the problem of the magnetic flux being spread due to the flat shape of the ferrite core is solved by providing the tapered portions 65.

Figure 4A:
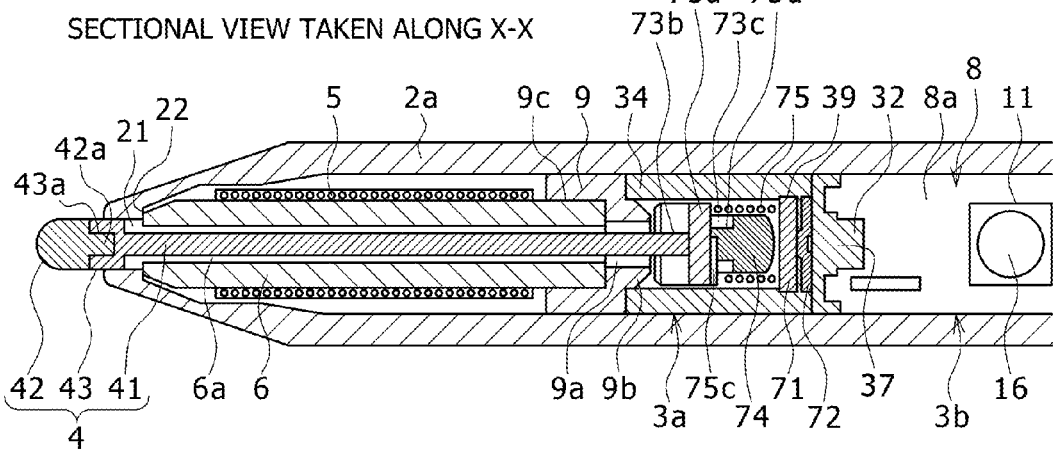
FIG. 4(A) is a sectional view taken along a line X-X of FIG. 1(B) principal parts of the first embodiment of the position indicator according to the present disclosure.
Figure 4B:
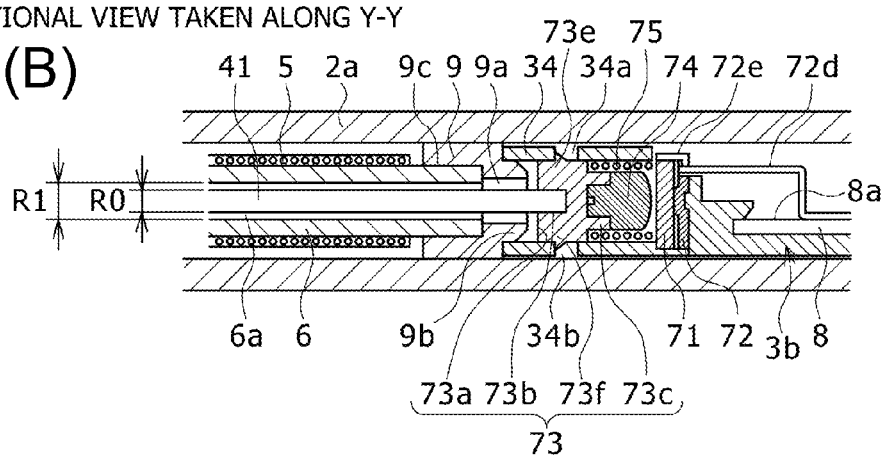
FIG. 4(B) is a sectional view taken along a line Y-Y of FIG. 1(B) of the parts.
Figure 4C:
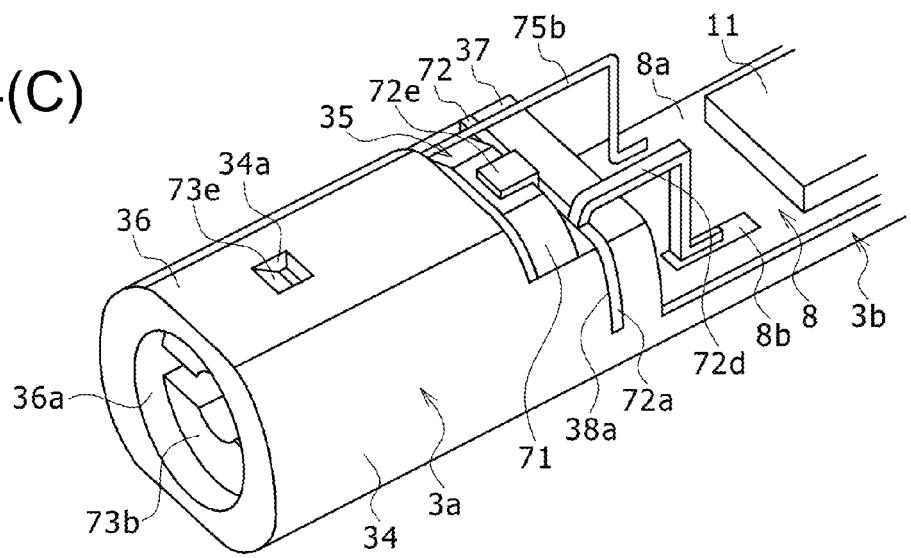
FIG. 4(C) is a perspective view of a holder portion of a holder.

FIG. 4(A) is a sectional view taken along a line X-X of FIG. 1(B). FIG. 4(A) is a fragmentary sectional view taken by cutting the position indicator 1 in a direction that passes through the axial position of the position indicator 1 and which is parallel with the above-described two straight lines 23 and 24 (see FIG. 1(B)) of the external shape of the case main body 2a. FIG. 4(B) is a sectional view taken along a line Y-Y of FIG. 1(B). FIG. 4(B) is a fragmentary sectional view taken by cutting the position indicator 1 in a direction that passes through the axial position of the position indicator 1 and which is perpendicular to the above-described two straight lines 23 and 24 of the external shape of the case main body 2a. FIG. 4(C) is a perspective view directing attention to a holder portion 3a, in particular, of the board holder 3.

The board holder 3 is formed of a resin, for example, and is formed so as to include the pressure sensing part holder portion 3a and a printed board mounting base portion 3b that are continuous with each other in a longitudinal direction as the axial direction of the position indicator 1 when the board holder 3 is housed within the hollow portion of the case main body 2a. Pressure sensing parts (a plurality of parts for pen pressure detection) 7 are housed in the pressure sensing part holder portion 3a. A printed board 8 is mounted and retained on the printed board mounting base portion 3b. The pressure sensing part holder portion 3a will hereinafter be abbreviated to the holder portion 3a for the simplicity of description. The holder portion 3a is formed closest to the core body 4 in the board holder 3.

The core body main body portion 41 of the core body 4 is inserted into the through hole 6a of the ferrite core 6, and is coupled to the pressure sensing parts 7 housed in the holder portion 3a. Part of the pressure sensing parts 7 are housed within the holder portion 3a in a state of being movable in the axial direction, and the core body main body portion 41 is coupled to the part of the pressure sensing parts 7 which part are movable in the axial direction. Hence, the core body 4 is coupled to the pressure sensing parts 7 in the holder portion 3a through the through hole 6a of the ferrite core 6 in a state of being movable in the axial direction.

In the present embodiment, as shown in FIG. 1(A), FIG. 2, and FIG. 4(A), the printed board 8 is provided with a push switch (side switch) 11 that is turned on when depressed and which returns to an off state when the depression is stopped, and is provided with capacitors 12 and 13 forming a resonance circuit together with the coil 5. Further, the printed board 8 is provided with an IC 14.

In the present example, a through hole 15 (see FIG. 2) is made at a position corresponding to the side switch 11 in the side circumferential surface of the case main body 2a of the position indicator 1. A depression operating element 16 of the side switch 11 is exposed such that the side switch 11 can be depressed through the through hole 15.

The capacitors 12 and 13 forming part of the resonance circuit and the IC 14 in the present example are disposed as chip parts on the printed board 8. In the present embodiment, the resonance frequency of the resonance circuit is adjusted by adjusting the capacitance of the trimmer capacitor 12.

The pressure sensing parts 7 formed by a plurality of parts as shown in FIG. 1(A) and FIG. 4 are housed in the holder portion 3a of the board holder 3. A pen pressure detecting module is formed by housing the pressure sensing parts 7 in the holder portion 3a. The core body main body portion 41 of the core body 4 is coupled to the pen pressure detecting module, whereby the pressure sensing parts 7 of the pen pressure detecting module detect pen pressure applied to the tip portion 42 of the core body 4. In this case, the pen pressure detecting module detects the pen pressure applied to the tip portion 42 of the core body 4 when part of the pressure sensing parts 7 forming the pen pressure detecting module move in the axial direction together with the core body 4 according to the pen pressure.

Incidentally, the core body 4 is detachably coupled to the board holder 3. That is, the core body 4 in the position indicator 1 according to the present embodiment is configured to be replaceable.

The core body main body portion 41 of the core body 4 in the present example is an elongate rod-shaped body having a circular cross section, and has an outside diameter R0 smaller than the inside diameter R1 of the through hole 6a of the ferrite core 6, as described above (see FIG. 4(B)). The tip portion 42 has a so-called shell type cylindrical shape. An outside diameter R2 (see FIG. 1(B)) of the tip portion 42 is selected to be larger than the inside diameter R1 of the through hole 6a of the ferrite core 6 and smaller than a diameter R3 of the opening portion 21 of the case main body 2a. The outside diameter R2 of the tip portion 42 is for example 1.0 mm to 2.0 mm.

In the present embodiment, a base portion 43 (see FIG. 4(A)) having a cylindrical shape whose outside diameter is equal to the outside diameter R2 of the tip portion 42 is formed integrally with the core body main body portion 41 of the core body 4. As shown in FIG. 4(A), the base portion 43 has, in a direction of a central axis thereof, a recessed portion 43a having an opening on an end surface side opposed to the tip portion 42. As shown in FIG. 4(A), a projecting portion 42a fitted in the recessed portion 43a of the base portion 43 is formed on an end surface of the tip portion 42 which end surface is opposed to the base portion 43. In the present embodiment, the core body 4 is formed by coupling the core body main body portion 41 and the base portion 43, which are formed integrally with each other, to the tip portion 42 by two-color molding.

In the present example, the core body main body portion 41 and the base portion 43 are formed of a resin as an example of a hard material, for example polycarbonate, synthetic resin, ABS (acrylonitrile-butadiene-styrene) resin, or the like so that the core body main body portion 41 can sufficiently transmit a pressure (pen pressure) applied to the tip portion 42 to the pressure sensing parts 7 of the board holder 3 in a state of the core body main body portion 41 being inserted in the through hole 6a of the ferrite core 6 and coupled to the pressure sensing parts 7.

The tip portion 42 is formed of a softer elastic material than the core body main body portion 41 and the base portion 43, for example an elastomer, preferably a thermosetting elastomer, so as not to damage the display screen 200D of the electronic device 200 even when in contact with the display screen 200D.

Next, description will be made of the holder portion 3a of the board holder 3 and the pressure sensing parts 7 forming the pen pressure detecting module. The pen pressure detecting module in the present example uses a variable capacitance capacitor whose capacitance varies according to a pen pressure applied to the core body 4 as in the pen pressure detecting module described earlier using Patent Document 1.

As shown in FIG. 1(A), the pressure sensing parts 7 in the present example are formed by a plurality of parts, that is, a dielectric 71, a terminal member 72, a retaining member 73, a conductive member 74, and an elastic member 75. The terminal member 72 forms a first electrode of the variable capacitance capacitor formed by the pressure sensing parts 7. In addition, the conductive member 74 and the elastic member 75 are electrically connected to each other to form a second electrode of the variable capacitance capacitor.

As shown in FIG. 4(C), the holder portion 3a of the board holder 3 is formed by a cylindrical body 34 having a hollow portion, and is formed so as to house the pressure sensing parts 7 arranged in the axial direction within the hollow portion of the cylindrical body 34.

Of the pressure sensing parts 7, the dielectric 71 and the terminal member 72, which are parts not moving in the axial direction within the holder portion 3a, are inserted into the cylindrical body 34 through an opening portion 35 formed in a portion of the side circumferential surface of the cylindrical body 34 forming the holder portion 3a and opened in a direction orthogonal to the axial direction, and are housed as shown in FIG. 4(C).

Slits 38a and 38b having a predetermined width slightly larger than the thickness of the terminal member 72 in the axial direction are formed in a coupling portion of the side circumferential surface of the cylindrical body 34 which coupling portion is coupled to a wall portion 37. Bulging portions 72a and 72b formed in the terminal member 72 are fitted into the slits 38a and 38b of the cylindrical body 34, whereby the terminal member 72 is locked within the cylindrical body 34 so as not to move in the axial direction.

A recessed groove 39 (see FIG. 4(A)) having a larger inside diameter than the inside diameter of a portion of the cylindrical body 34 in which portion the opening portion 35 is formed is formed at a position adjacent to the slits 38a and 38b in the axial direction in the inner wall of the cylindrical body 34. The dielectric 71 is formed as a plate-shaped object having an external shape to be fitted into the recessed groove 39 and having a thickness corresponding to a width in the axial direction of the recessed groove 39. The dielectric 71 is inserted and fitted into the recessed groove 39 of the cylindrical body 34 through the opening portion 35. The dielectric 71 in the fitted state is thereby prevented from moving in the axial direction within the cylindrical body 34.

In addition, the cylindrical body 34 forming the holder portion 3a has an opening 36a on the side of the core body 4 in the axial direction of the cylindrical body 34. The cylindrical body 34 forming the holder portion 3a is closed by the wall portion 37 on the side of the printed board mounting base portion 3b.

The conductive member 74 coupled to the retaining member 73 in the axial direction of the retaining member 73 with the elastic member 75 interposed therebetween is inserted into the cylindrical body 34 from the side of the opening 36a. Engaging projecting portions 73e and 73f formed on the side circumferential surface of a cylindrical shape portion 73a of the retaining member 73 are engaged with engaging holes 34a and 34b (see FIGS. 4(B) and 4(C)) formed in the side circumferential surface of the cylindrical body 34 forming the holder portion 3a. The retaining member 73 is thereby locked to the cylindrical body 34. However, the engaging projecting portions 73e and 73f and the engaging holes 34a and 34b are formed such that retaining member 73 is movable in the axial direction of the cylindrical body 34 within the hollow portion of the cylindrical body 34 in a state of being housed within the hollow portion of the cylindrical body 34.

The terminal member 72 playing the role of the first electrode of the variable capacitance capacitor has a lead portion 72d. This lead portion 72d straddles the wall portion 37 of the cylindrical body 34 when the terminal member 72 is housed within the holder portion 3a, and is connected by soldering to a land portion 8b (see FIG. 4(C)) on a board surface 8a of the printed board 8 mounted on the printed board mounting base portion 3b.

Incidentally, the terminal member 72 has an L-shaped projection 72e that holds down an opening side end portion of the dielectric 71 when the dielectric 71 and the terminal member 72 are housed within the holder portion 3a.

The retaining member 73 has the cylindrical shape portion 73a having a recessed hole 73b into which to press-fit the core body main body portion 41 of the core body 4 on the side of the core body 4 in the axial direction of the retaining member 73 and a ring-shaped projecting portion 73c having a recessed hole 73d into which to fit the conductive member 74 on an opposite side in the axial direction from the side of the recessed hole 73b.

The conductive member 74 is made of a conductive and elastically deformable elastic member, and is for example formed by a silicon conductive rubber or a pressure conductive rubber. The conductive member 74 includes a projecting portion 74a to be fitted into the recessed hole 73d of the ring-shaped projecting portion 73c of the retaining member 73. The elastic member 75 is for example formed by a conductive coil spring. The elastic member 75 has an elastic winding portion 75a, a terminal piece 75b at one end portion of the winding portion 75a, and a connecting portion 75c at another end portion of the winding portion 75a.

The elastic member 75 is combined in the axial direction of the retaining member 73 so as to house the ring-shaped projecting portion 73c of the retaining member 73 within the winding portion 75a. The projecting portion 74a of the conductive member 74 is fitted into the recessed hole 73d of the ring-shaped projecting portion 73c of the retaining member 73. At this time, the connecting portion 75c of the elastic member 75 is inserted from a slit portion of the ring-shaped projecting portion 73c of the retaining member 73 into the bottom of the recessed hole 73d formed in the ring-shaped projecting portion 73c (see FIG. 4(A) and FIG. 4(B)). Hence, when a small-diameter portion 74b of the conductive member 74 is press-fitted into the ring-shaped projecting portion 73c of the retaining member 73, the end surface of the small-diameter portion 74b of the conductive member 74 is brought into contact with the connecting portion 75c of the conductive elastic member 75, and is thus electrically connected to the connecting portion 75c.

The terminal piece 75b of the elastic member 75 straddles the dielectric 71, the terminal member 72, and the wall portion 37 when the elastic member 75 is inserted within the cylindrical body 34, and is connected by soldering to a conductive pattern on the board surface 8a of the printed board 8 mounted on the printed board mounting base portion 3b.

After the pressure sensing parts 7 are housed within the cylindrical body 34 forming the holder portion 3a as described above, an anti-falling member 9 is press-fitted into the opening 36a of the cylindrical body 34, as shown in FIGS. 4(A) and (B). As shown in FIGS. 4(A) and (B), the anti-falling member 9 has a cylindrical portion 9b having an outside diameter substantially equal to or slightly smaller than an inside diameter of a portion 36 of the cylindrical body 34 which portion 36 is on the side of the opening 36a. The anti-falling member 9 is coupled to the holder portion 3a by press-fitting the cylindrical portion 9b of the anti-falling member 9 into the portion 36 of the cylindrical body 34 which portion 36 is on the side of the opening 36a.

In addition, the anti-falling member 9 has a recessed portion 9c corresponding to the cross-sectional shape of the ferrite core 6 which recessed portion 9c is formed on an opposite side from the cylindrical portion 9b in the axial direction. The ferrite core 6 is coupled to the holder portion 3a via the anti-falling member 9 by press-fitting an end portion of the ferrite core 6 which end portion is on an opposite side from the side of the tip portion 42 of the core body 4 into the recessed portion 9c of the anti-falling member 9. Further, the anti-falling member 9 has a through hole 9a formed so as to communicate with the through hole 6a of the ferrite core 6. A diameter of the through hole 9a in the example of FIG. 4(A) is larger than the through hole 6a of the ferrite core 6.

Next, in a state of the ferrite core 6 being coupled to the board holder 3 as described above, the core body main body portion 41 of the core body 4 is inserted into the through hole 6a of the ferrite core 6. Then, an end portion of the core body main body portion 41 of the core body 4 projects to the side of the retaining member 73 through the through hole 6a of the ferrite core 6 and the through hole 9a of the anti-falling member 9. The end portion of the core body main body portion 41 of the core body 4 is press-fitted into the recessed hole 73b of the cylindrical shape portion 73a of the retaining member 73 housed in the holder portion 3a. In this case, even in a state in which the core body 4 is press-fitted in the recessed hole 73b of the cylindrical shape portion 73a, the core body main body portion 41 of the core body 4 is also exposed from the ferrite core 6 to the side of the tip portion 42 of the core body 4, as shown in FIG. 4(A). A pressure (pen pressure) applied to the tip portion 42 of the core body 4 can displace the core body 4 to the side of the case cap 2b in the axial direction against the biasing force of the elastic member 75.

The core body 4 can be extracted from the recessed hole 73b of the cylindrical shape portion 73a of the retaining member 73 after being press-fitted into the recessed hole 73b. Hence, as described above, the core body 4 is replaceable.

As described above, the printed board 8 is mounted on the printed board mounting base portion 3b of the board holder 3 coupled to the case cap 2b, the pressure sensing parts 7 are housed in the holder portion 3a, and the ferrite core 6 and the core body 4 are coupled to the holder portion 3a, whereby a module part is formed.

Next, this module part is inserted into the hollow portion of the case main body 2a so that the tip portion 42 of the core body 4 projects from the opening portion 21 of the case main body 2a to the outside. Then, the case main body 2a and the case cap 2b are coupled to each other, whereby the position indicator 1 is completed.

In the position indicator 1, when a pressure is applied to the tip portion 42 of the core body 4, the core body 4 is displaced in a direction of the inside of the case main body 2a in the axial direction according to the pressure. Then, the displacement of the core body 4 displaces the retaining member 73 within the holder portion 3a which retaining member 73 is coupled to the core body main body portion 41 to the side of the dielectric 71 against the elastic biasing force of the elastic member 75. As a result, the conductive member 74 fitted in the retaining member 73 is displaced to the side of the dielectric 71, so that a distance between the conductive member 74 and the dielectric 71 and, further, a contact area between the conductive member 74 and the dielectric 71 change according to the pressure applied to the core body 4.

The capacitance of the variable capacitance capacitor formed between the terminal member 72 forming the first electrode and the conductive member 74 forming the second electrode thereby changes according to the pressure applied to the core body 4. The change in the capacitance of the variable capacitance capacitor is transmitted from the position indicator 1 to the position detecting device 202, whereby the position detecting device 202 detects the pen pressure applied to the core body 4 of the position indicator 1.

A circuit configuration known in the past, such as a configuration described in Japanese Patent Laid-Open No. 2005-10844 or Japanese Patent Laid-Open No. 2007-164356, for example, can be applied to the circuit configuration of the position detecting device 202 performing position detection and pen pressure detection by electromagnetic induction coupling with the position indicator 1 according to the present first embodiment, and therefore detailed description thereof will be omitted in the present specification.

In the above-described position indicator 1, the ferrite core 6 as an example of a magnetic core is formed into a flat shape, whereby the shape of the case main body 2a housing the ferrite core 6 can also be made flat. Thus, even when the casing of the electronic device housing the position indicator 1 is reduced in thickness, provisions can be made for the thickness reduction.

Because the ferrite core 6 has a flat shape, the ferrite core 6 can be widened in the direction orthogonal to the direction in which the ferrite core 6 is limited to a short length due to the reduction in thickness of the casing of the electronic device, and the cross-sectional area of the ferrite core 6 can be correspondingly increased. Therefore, the length in the longitudinal direction of the flat shape can compensate for a decrease in the cross-sectional area of the coil due to the thinning of the position indicator 1, and the thinning of the casing of the position indicator can be realized while degradation in signals transmitted and received to and from the sensor of the position detecting device is prevented.

In addition, the ferrite core 6 has the tapered portions 65 formed at the end portion of the ferrite core 6 which end portion is on the side of the tip portion 42 of the core body 4 involved in the transmission and reception of the signals. Thus, a magnetic flux exchanged between the position indicator 1 and the sensor of the position detecting device 202 can be concentrated on the part of the annular flat surface 67 narrowed by the tapered portions 65. Therefore, the sensor of the position detecting device 202 can excellently detect a position indicated by the position indicator 1, and also have an excellent pen pressure detecting characteristic.

Further, because the cross section of the ferrite core 6 has a flat shape, a thick portion in the longitudinal direction of the cross section can be thickened even when the through hole 6a for inserting the core body main body portion 41 of the core body 4 is present in the position of the central axis of the ferrite core 6. Thus, it is also possible to make the magnetic core resistant to damage caused by a stress applied to the casing of the position indicator due to an impact when the position indicator falls.

[Second Embodiment]

A second embodiment of the position indicator according to the present invention will next be described with reference to FIG. 5 to FIG. 9(B). The position indicator 1 according to the first embodiment uses a variable capacitance capacitor for pen pressure detection. A position indicator 1B according to the second embodiment detects a change in the inductance value of a coil forming a resonance circuit for pen pressure detection.

As in the first embodiment, the position indicator 1B according to the second embodiment is used in conjunction with a position detecting device 202B included in an electronic device 200 shown in FIG. 2. However, the position detecting device 202B uses a different pen pressure detecting method from that of the position detecting device 202 so as to correspond to the use of a change in the inductance value of the coil of the resonance circuit for pen pressure detection by the position indicator 1B according to the second embodiment. Incidentally, in the description of the second embodiment, the same parts as in the first embodiment are identified by the same reference symbols, and detailed description thereof will be omitted. In addition, in the following description of the second embodiment, parts corresponding to the respective parts in the first embodiment but different from those in the first embodiment are identified by adding a suffix B to the same reference symbols.

Figure 5:
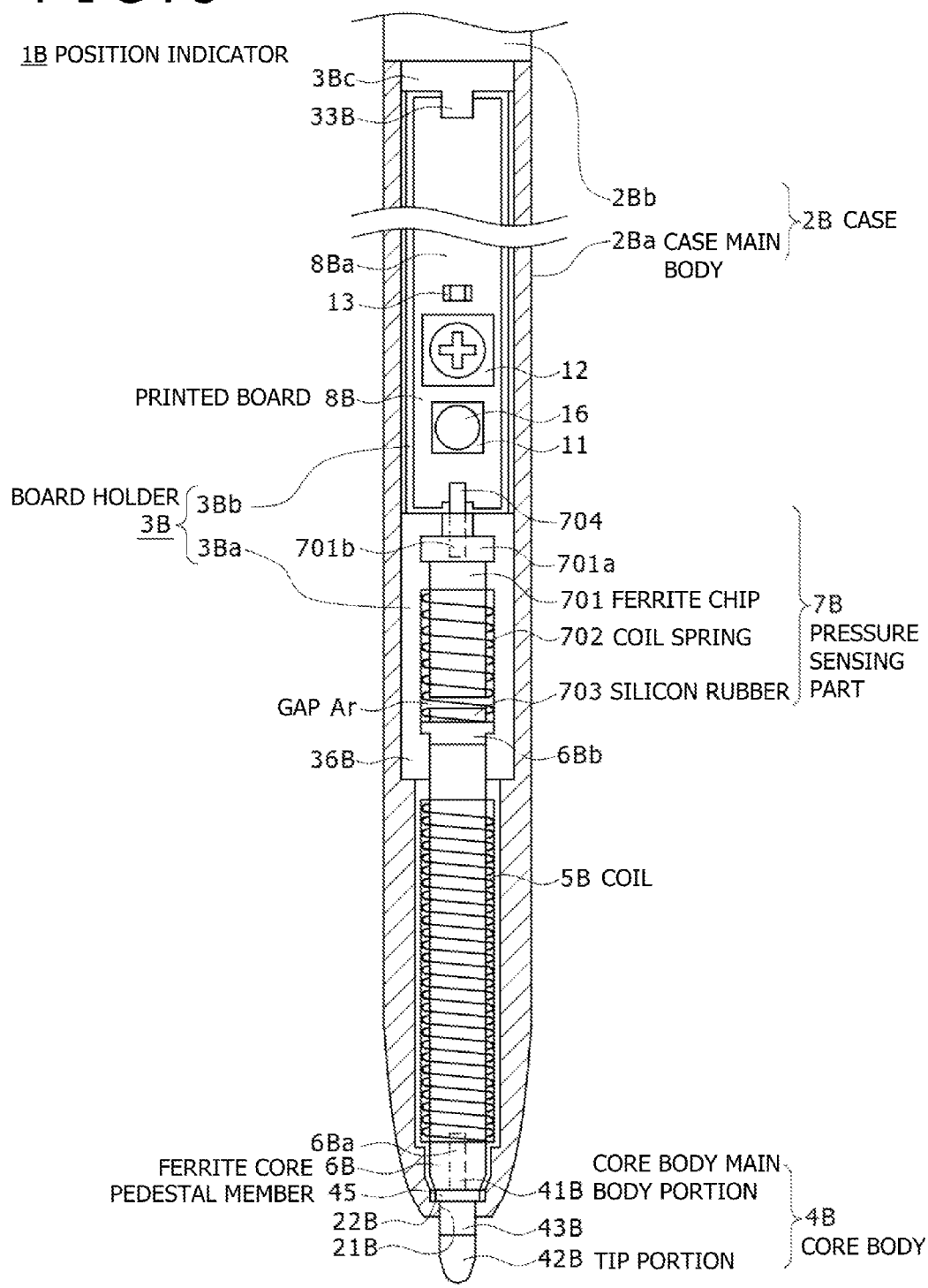
FIG. 5 is a sectional view of a second embodiment of the position indicator according to the present disclosure.

FIG. 5 shows an outline of the whole of the position indicator 1B according to the second embodiment. As with FIG. 1(A) in the foregoing first embodiment, FIG. 5 shows the inside of a case main body 2Ba of a case 2B of the position indicator 1B with only the case main body 2Ba cut away for purposes of illustration.

In the second embodiment, as in the first embodiment, a board holder 3B formed of a resin, for example, which board holder 3B retains a core body 4B, a ferrite core 6B wound with a coil 5B, pressure sensing parts (pen pressure detecting parts) 7B, and a printed board 8B, is housed within a hollow portion of the case main body 2Ba. As in the board holder 3 of the first embodiment, an end portion in a longitudinal direction of the board holder 3B is coupled to a case cap 2Bb at a coupling portion 3Bc of the board holder 3B.

In the position indicator 1B according to the second embodiment, the ferrite core 6B is not provided with a through hole, but the core body 4B is detachably coupled to the ferrite core 6B. In this case, in the second embodiment, the core body 4B is detachably mounted on and coupled to the ferrite core 6B via a pedestal member 45, as will be described later. When a pen pressure is applied to the core body 4B, the core body 4B and the ferrite core 6B are integrally displaced to transmit the pressure to the pressure sensing parts 7B.

Figure 6A:
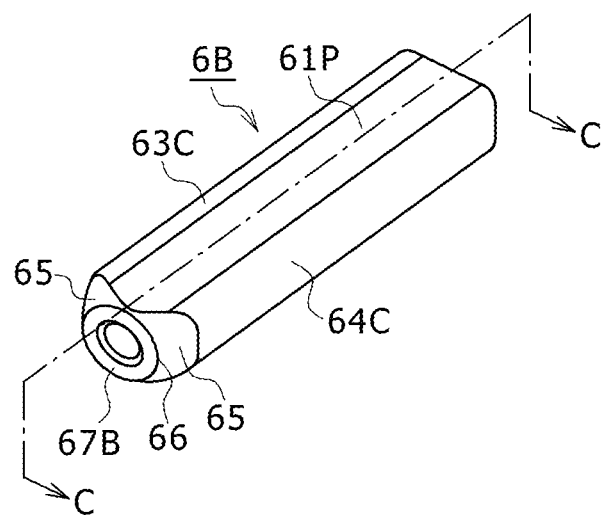
FIG. 6(A) is a perspective view of a ferrite core that may be used as a principal part of the second embodiment of the position indicator according to the present disclosure.
Figure 6B:
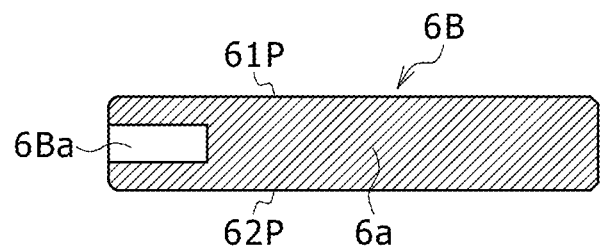
FIG. 6(B) is a sectional view of taken along a line C-C of FIG. 6(A) of the ferrite core.

FIGS. 6(A) and 6(B) are diagrams of assistance in explaining the constitution of the ferrite core 6B in the second embodiment. FIG. 6(A) is a perspective view of the ferrite core 6B. FIG. 6(B) is a sectional view taken along a line C-C of FIG. 6(A), and is a sectional view corresponding to FIG. 3(E).

As shown in FIGS. 6(A) and 6(B), the ferrite core 6B in the second embodiment is formed in a similar manner to the ferrite core 6 in the first embodiment except that a recessed hole 6Ba for detachably coupling the core body 4B is formed in the ferrite core 6B in place of the through hole 6a. The recessed hole 6Ba is provided in an end portion in the direction of the central axis of the ferrite core 6B which end portion is on the side of an tip portion of the core body 4B. As will be described later, an inside diameter of the recessed hole 6Ba is selected to be a value slightly larger than a diameter of a core body main body portion 41B of the core body 4B.

Figure 7A:
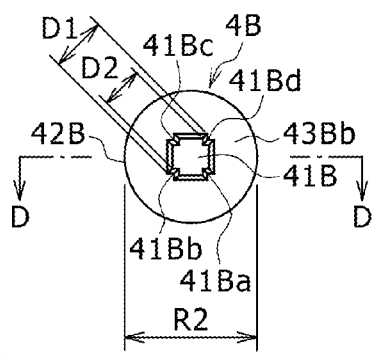
FIG. 7(A) is a top plan view of a core body that may be used in the second embodiment of the position indicator according to the present disclosure.
Figure 7B:
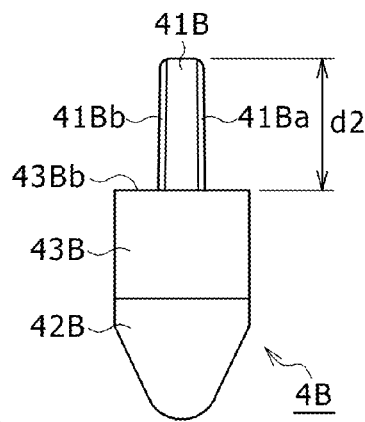
FIG. 7(B) is a side plane view of the core body.
Figure 7C:
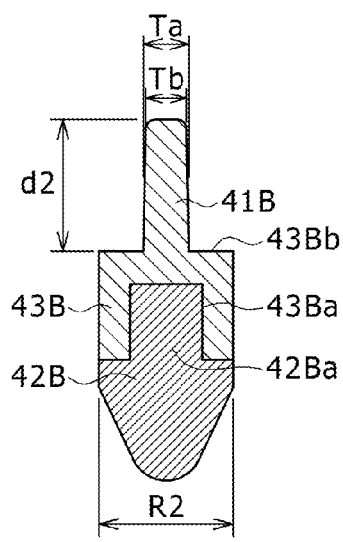
FIG. 7(C) is a sectional view taken along a line D-D in FIG. 7(A) of the core body.
Figure 7D:
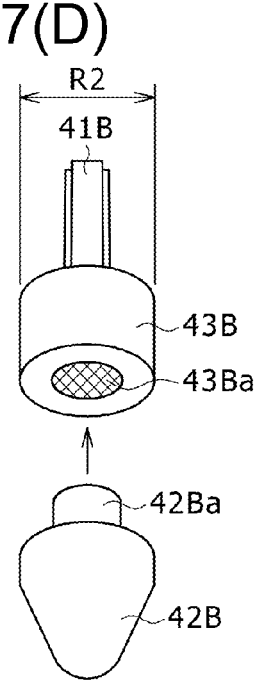
FIG. 7(D) is an exploded view of the core body.
Figure 7E:
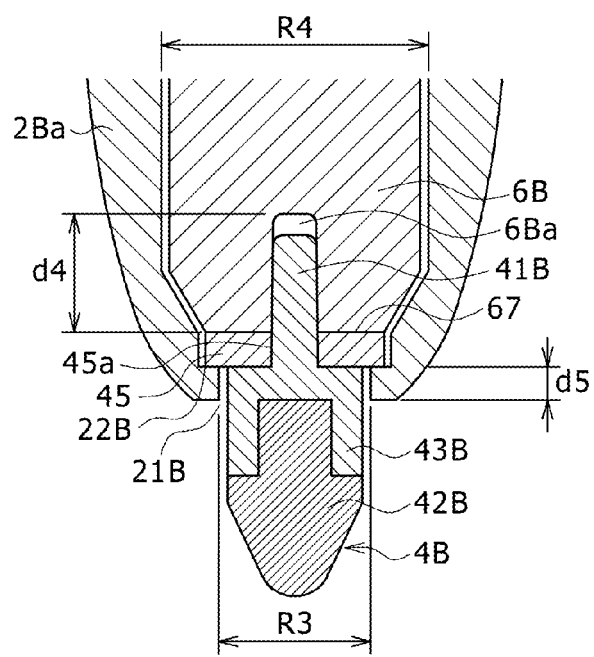
FIG. 7(E) is an enlarged sectional view of a portion of a position indicator that includes the core body.

FIGS. 7(A) to 7(E) are diagrams of assistance in explaining the constitution of the core body 4B in the second embodiment. FIG. 7(A) is a view of the core body 4B in the second embodiment as viewed in the axial direction of the core body 4B from an opposite side from a tip portion 42B. FIG. 7(B) is a side view of the core body 4B. FIG. 7(C) is a sectional view taken along a line D-D in FIG. 7(A). FIG. 7(D) is an assembly configuration diagram of the core body 4B in the second embodiment. FIG. 7(E) is an enlarged sectional view of the core body 4B and vicinities thereof in the position indicator 1B according to the second embodiment shown in FIG. 5.

In the second embodiment, as shown in FIGS. 7(A) to 7(E), as with the core body 4 in the first embodiment, the core body 4B includes the core body main body portion 41B and the tip portion 42B. The core body main body portion 41B includes a base portion 43B coupled to the tip portion 42B. The tip portion 42B is welded, particularly thermally welded, and coupled to the base portion 43B integral with the core body main body portion 41B by two-color molding as in the core body 4 in the first embodiment. In this case, as shown in FIG. 7(C), the core body 4B is formed by coupling the base portion 43B and the tip portion 42B to each other by two-color molding such that a projecting portion 42Ba of the tip portion 42B is fitted into a fitting recessed portion 43Ba of the base portion 43B.

Also in the second embodiment, the tip portion 42B is formed of an elastic material, for example a thermoplastic elastomer. The base portion 43B and the core body main body portion 41B integral with the base portion 43B are formed of a hard resin, for example POM (polyoxymethylene; polyacetal) resin. The base portion 43B and the core body main body portion 41B may also be formed of ABS resin.

The core body main body portion 41B of the core body 4B in the second embodiment is fitted into and coupled to the ferrite core 6B without being inserted through the ferrite core 6B in the axial direction. Thus, the length in the axial direction of the core body main body portion 41B is shorter than that of the core body 4 in the first embodiment. In addition, since the core body main body portion 41B is coupled to the ferrite core 6B via the pedestal member 45, the cross-sectional shape of the core body main body portion 41B is different from that of the core body 4 in the first embodiment.

As shown in FIG. 7(A), the core body main body portion 41B in the present example has the shape of a quadrangular prism as a whole, and has a shape in which four angular portions 41Ba, 41Bb, 41Bc and 41Bd formed by four side surfaces of the quadrangular prism are each notched into a rectangular shape along the direction of the central axis. That is, the cross section of the core body main body portion 41B is equal to a shape obtained by making two rectangles intersect each other in the shape of a cross such that the directions of long sides of the rectangles are orthogonal to each other in a state of the rectangles having a same gravity center position (see FIG. 7(A)).

As shown in FIGS. 7(B) to 7(E), the core body main body portion 41B is formed so as to be gradually thinned toward the end side of the core body main body portion 41B. Specifically, as shown in FIG. 7(C), the core body main body portion 41B is formed such that a distance Tb between side surfaces opposed to each other on the end side of the core body main body portion 41B is smaller than a distance Ta between the same side surfaces opposed to each other at the position of a coupling portion of the core body main body portion 41B which coupling portion is coupled to the base portion 43B. The length d2 in the axial direction of the core body main body portion 41B (see FIG. 7(C)) is selected to be larger than the height (thickness) d3 of the pedestal member 45 (see FIG. 8(B)), and is selected to be equal to or shorter than the depth of the recessed hole 6Ba of the ferrite core 6B.

Figure 8A:
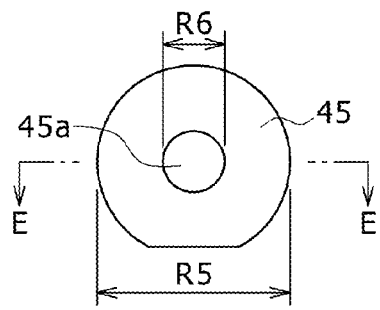
FIG. 8(A) is a top plan view of a part that may be used in the second embodiment of the position indicator according to the present disclosure.
Figure 8B:
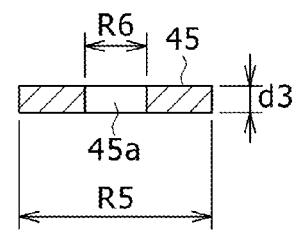
FIG. 8(B) is a sectional view taken along a line E-E in FIG. 8(A) of the part.

The pedestal member 45 will next be described. FIGS. 8(A) and 8(B) are diagrams showing an example of constitution of the pedestal member 45. FIG. 8(A) is a top view of the pedestal member 45 as viewed from the axial direction of the pedestal member 45. FIG. 8(B) is a sectional view taken along a line E-E in FIG. 8(A).

As shown in FIGS. 8(A) and 8(B), the pedestal member 45 is a hollow cylinder (ring-shaped disk) having a height (thickness) d3 (d3<d2). Here, the height (thickness) d3 of the pedestal member 45 is for example 0.3 to 0.4 mm. A diameter R5 of an outer circumferential circle of the pedestal member 45 is set to be a value larger than a diameter R2 of the tip portion 42B of the core body 4B.

The pedestal member 45 has a through hole 45a in a central position of the pedestal member 45, the through hole 45a having a circular cross-sectional shape concentric with the outer circumferential circle of the pedestal member 45 and having a diameter R6. The pedestal member 45 in the present example is formed of a material, for example polycarbonate, having higher hardness than the base portion 43B and the core body main body portion 41B of the core body 4B, the base portion 43B and the core body main body portion 41B being formed of POM resin or ABS resin.

The pedestal member 45 in the present example is fixed to an annular flat surface 67 of the ferrite core 6B which annular flat surface 67 is on the side of the core body 4B by bonding one plate surface in the axial direction of the pedestal member 45 to the annular flat surface 67 by an adhesive. The diameter of the recessed hole 6Ba formed in the center of the annular flat surface 67 of the ferrite core 6B which annular flat surface 67 is on the side of the core body 4B is the same as the diameter R6 of the through hole 45a of the pedestal member 45, or slightly larger than the diameter R6, as shown in FIG. 7(E). The depth d4 of the recessed hole 6Ba is set larger than a length obtained by subtracting the height d3 of the pedestal member 45 from the length d2 in the axial direction of the core body main body portion 41B of the core body 4B (d4>d2−d3). The pedestal member 45 is bonded to the ferrite core 6B after being aligned such that the central position of the through hole 45a of the pedestal member 45 coincides with the central position of the recessed hole 6Ba of the ferrite core 6B.

Also in the second embodiment, as shown in FIG. 5 and FIG. 7(E), as in the first embodiment, an opening portion 21B for projecting the tip portion 42B of the core body 4B to the outside is provided on one end side in the axial direction of the case main body 2Ba. In this case, as shown in FIG. 7(E), as in the first embodiment, the hollow portion of the case main body 2Ba has a diameter larger than the diameter R3 of the opening portion 21B, and has a step portion 22B formed on an inner wall surface forming the hollow portion on the side of the opening portion 21B.

As shown in FIG. 5 and FIG. 7(E), the ferrite core 6B is disposed within the case main body 2Ba such that the end surface of the pedestal member 45 bonded to the ferrite core 6B is engaged with the step portion 22B on the side of the opening portion 21B within the hollow portion of the case main body 2Ba and such that the central position of the through hole 45a of the pedestal member 45 coincides with the central position of the opening portion 21B of the case main body 2Ba.

In this case, as shown in FIG. 7(E), the outside diameter R5 of the pedestal member 45 is smaller than the diameter R4 of the hollow portion on the side where the opening portion 21B of the case main body 2Ba of the position indicator 1B is formed, and is larger than the diameter R3 of the opening portion 21B of the case main body 2Ba. That is, the outside diameter R5 of the pedestal member 45 is set such that R3<R5<R4. Hence, the pedestal member 45 is locked by the step portion 22B within the case main body 2Ba without falling off the opening portion 21B of the case main body 2Ba.

The diameter R6 of the through hole 45a of the pedestal member 45 is a diameter into which to press-fit the core body main body portion 41B of the core body 4B. Specifically, in the present example, as shown in FIG. 7(A), letting D1 be a longest diagonal distance between notch portions located on a diagonal among the notch portions 41Ba to 41Bd of the four angular portions in the cross-sectional shape of the core body main body portion 41B, that is, the notch portion 41Bb and the notch portion 41Bd in the example of FIG. 7(A), and letting D2 be a shortest diagonal distance between the notch portions, the diameter R6 of the through hole 45a is selected such that $$D2 < R6 < D1 \qquad \text{(Expression 1)}$$

Here, the core body main body portion 41B has such a shape as to be tapered toward the end side of the core body main body portion 41B. The longest diagonal distance D1 between the notch portion 41Bb and the notch portion 41Bd is a value at the coupling portion of the core body main body portion 41B which coupling portion is coupled to the base portion 43B. The shortest diagonal distance D2 between the notch portion 41Bb and the notch portion 41Bd is a value at the end portion of the core body main body portion 41B.

Figure 9A:
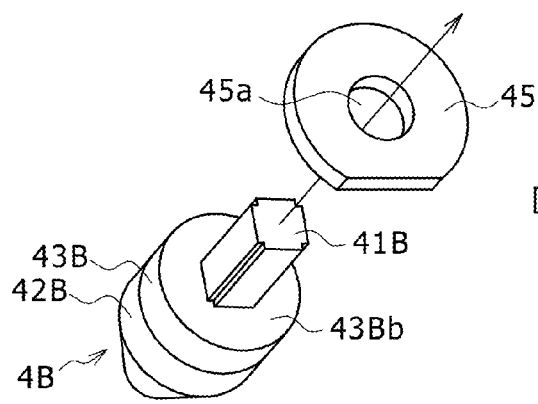
FIG. 9(A) is an exploded perspective view of parts that may be used in the second embodiment of the position indicator according to the present disclosure.
Figure 9B:
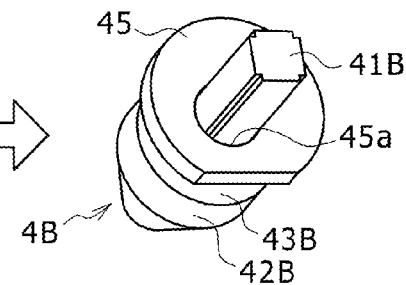
FIG. 9(B) is a perspective view of the parts.

As a result of the through hole 45a of the pedestal member 45 having a circular shape, the cross-sectional shape of the core body main body portion 41B having angular portions, and size relation being set between the diameter R6 of the through hole 45a of the pedestal member 45 and the size of the core body main body portion 41B, as described above, when the core body main body portion 41B is inserted into the through hole 45a of the pedestal member 45 as shown in FIG. 9(A), the core body main body portion 41B having lower hardness than the pedestal member 45 is partially deformed. Thereby, as shown in FIG. 9(B), the core body main body portion 41B is fitted into the pedestal member 45, and is press-fitted and retained by the pedestal member 45.

If the core body main body portion 41B is formed so as to be tapered toward the end as described above in a case where the through hole 45a of the pedestal member 45 has a circular cross-sectional shape and the core body main body portion 41B has a circular cross-sectional shape, the through hole 45a of the pedestal member 45 and the core body main body portion 41B come into contact with each other with circular lines, and thus the core body main body portion 41B cannot be elastically deformed, so that the core body main body portion 41B may not be pushed into the through hole 45a of the pedestal member 45 up to the coupling portion (base portion) of the core body main body portion 41B which coupling portion is coupled to the base portion 43B. In particular, it is very difficult to form the through hole 45a with high precision in order to push the core body main body portion 41B up to the base of the thin core body main body portion 41B and fit the core body main body portion 41B securely as in the present embodiment.

On the other hand, the cross-sectional shape of the core body main body portion 41B in the present example has a plurality of angular portions, and the cross-sectional shape of the through hole 45a of the pedestal member 45 is a circular shape. The cross-sectional shapes are thus different from each other.

As shown in FIG. 7(A), the core body main body portion 41B in the present example has the notch portions 41Ba to 41Bd of the four angular portions. Thus, when the core body main body portion 41B is inserted into the circular through hole 45a of the pedestal member 45, the core body main body portion 41B comes into contact with the inner wall surface of the through hole 45a at eight points. The contact positions are short of the coupling portion of the core body main body portion 41B which coupling portion is coupled to the base portion 43B because the core body main body portion 41B is formed so as to be tapered toward the end, as is also shown in FIG. 7(C).

However, when the core body main body portion 41B is further press-fitted from the positions into the through hole 45a up to the coupling portion coupled to the base portion 43B, the core body main body portion 41B is deformed such that the angular portions are crushed by the press-fitting, the deformation being facilitated by a fact that the material of the core body main body portion 41B has lower hardness than the material of the pedestal member 45 and a fact that the contact portions of the core body main body portion 41B which contact portions are in contact with the through hole 45a of the pedestal member 45 are the angular portions at the eight points. Thus, the core body main body portion 41B is securely fitted into the through hole 45a of the pedestal member 45. The core body 4B is thereby press-fitted and retained by the pedestal member 45.

However, when a force is applied to the core body 4B so as to extract the core body 4B from the pedestal member 45 in the securely retained state as described above, the core body main body portion 41B of the core body 4B is released from the state of being press-fitted and retained by the pedestal member 45, so that the core body 4B can be easily extracted from the pedestal member 45. Hence, the core body 4B is replaceable also in the position indicator 1B according to the second embodiment.

As described above, according to the foregoing second embodiment, the position indicator 1B allowing the core body 4B to be detachable can be realized by forming the core body 4B such that the core body 4B is retained by using the pedestal member 45 instead of being press-fitted directly into the ferrite core. In this case, according to the second embodiment, the ferrite core 6B does not need to be provided with the through hole 6a for inserting the core body main body portion 41 as in the first embodiment. Thus, because the through hole 6a does not need to be provided, the ferrite core 6B can be correspondingly thinned easily, and the position indicator 1B can be formed in a thinner shape.

[Constitution of Board Holder 3B and Pressure Sensing Parts 7B]

As shown in FIG. 5, as with the board holder 3 according to the first embodiment, the board holder 3B has a pressure sensing part holder portion 3Ba (hereinafter abbreviated to a holder portion 3Ba) on the side of the core body 4B, and has a printed board mounting base portion 3Bb formed so as to be continuous with the holder portion 3Ba on an opposite side from the side of the core body 4B.

The pressure sensing parts 7B in the second embodiment include a ferrite chip 701, a coil spring 702, and an elastic body, or a silicon rubber 703 in the present example. Incidentally, the ferrite core 6B is an example of a first magnetic substance, and the ferrite chip 701 is an example of a second magnetic substance.

In the holder portion 3Ba, the ferrite chip 701, the coil spring 702, and the silicon rubber 703 forming the pressure sensing parts 7B are arranged in order and retained in an axial direction along a direction of going from the side of the printed board mounting base portion 3Bb to the side of the core body 4B. Further, a printed board 8B is mounted on the printed board mounting base portion 3Bb of the board holder 3B.

In the position indicator 1B according to the second embodiment, a side switch 11, capacitors 12 and 13, and other parts and a conductor pattern are provided on a board surface 8Ba of the printed board 8B as in the first embodiment. However, in the second embodiment, unlike the first embodiment, an IC 14 and a peripheral circuit thereof are not provided on the printed board 8B. Incidentally, as shown in FIG. 5, also in the second embodiment, the printed board 8B in a state of being mounted and locked on the printed board mounting base portion 3Bb is separated from an inner wall surface of the case main body 2Ba without being in contact with the inner wall surface of the case main body 2Ba.

The ferrite core 6B has a flange portion 6Bb having a diameter larger than a winding portion of the coil 5B on an opposite side from the side of the core body 4B. The part of the flange portion 6Bb is locked by the holder portion 3Ba. The ferrite core 6B is thereby locked to and retained by the board holder 3B.

In the second embodiment, when a user of the position indicator 1B applies a pressing force (pen pressure) to the tip portion 42B of the core body 4B, the end surface of the flange portion 6Bb of the ferrite core 6B to which the core body 4B is coupled is displaced and brought closer to the side of the ferrite chip 701 against the biasing force of the coil spring 702 according to the pressing force. Then, the inductance of the coil 5B changes accordingly, and the phase (resonance frequency) of a radio wave transmitted from the coil 5B of the resonance circuit changes accordingly.

Further, when the pressing force is increased, the end surface of the ferrite chip 701 abuts against the silicon rubber 703, and elastically deforms the silicon rubber 703. Thereby, the inductance of the coil 5B changes, and the phase (resonance frequency) of the radio wave transmitted from the coil 5B of the resonance circuit changes, with a changing characteristic corresponding to the elastic modulus of the silicon rubber 703.

Incidentally, in the second embodiment, the coil spring 702 has a smaller elastic modulus than the silicon rubber 703. Specifically, letting k1 be the elastic modulus of the coil spring 702, and letting k2 be the elastic modulus of the silicon rubber 703, a relation k1<k2 holds. Hence, the coil spring 702 is elastically deformed by a small pressing force, while the silicon rubber 703 is not elastically deformed unless a larger pressing force than is necessary to elastically deform the coil spring 702 is applied to the silicon rubber 703.

A circuit configuration known in the past, such as a configuration described in Japanese Patent Laid-Open No. 2010-129920, can be applied to the circuit configuration of the position detecting device 202B performing position detection and pen pressure detection by electromagnetic induction coupling with the position indicator 1B according to the present second embodiment, and therefore detailed description thereof will be omitted in the present specification.

Incidentally, in the foregoing second embodiment, as a method for changing the inductance of the coil of the resonance circuit to detect a pen pressure, the ferrite core as the first magnetic substance is moved with respect to the ferrite chip as the second magnetic substance according to the application of the pen pressure. Thus, the core body 4B is fitted in the ferrite core 6B as the first magnetic substance via the pedestal member 45.

However, as another method for changing the inductance of the coil of the resonance circuit to detect a pen pressure, the ferrite chip as the second magnetic substance is moved with respect to the ferrite core as the first magnetic substance wound with the coil according to the application of the pen pressure. Adoptable in that case are both forms of a constitution in which the ferrite chip is disposed between the ferrite core and the tip portion of the core body and a constitution in which the ferrite chip is disposed on the opposite side of the ferrite core from the tip portion of the core body.

The present invention is also applicable to position indicators in which a ferrite chip is thus moved.

In the former case of the constitution in which the ferrite chip is disposed between the ferrite core and the tip portion of the core body, the core body 4B is fitted into the ferrite chip as the second magnetic substance via the pedestal member 45. In that case, a recessed hole into which to insert the core body main body portion 41B of the core body 4B is formed in an end surface of the ferrite chip to which end surface the pedestal member is bonded. However, when the ferrite chip is provided on the core body side of the ferrite core as the first magnetic substance, the recessed hole for inserting the core body main body portion of the core body does not need to be formed in the ferrite core as the first magnetic substance.

In the latter case, the ferrite core needs to be provided with a through hole as in the first embodiment in order to transmit a pressure applied to the tip portion of the core body to the ferrite chip. Also in the case of the latter constitution, the core body can be fitted into the ferrite chip as the second magnetic substance via the pedestal member 45. Incidentally, in the case of the latter constitution, the core body main body portion of the core body can also be detachably press-fitted into the ferrite chip without the use of the pedestal member.

The position indicator 1B according to the second embodiment described above produces similar effects to those of the foregoing first embodiment. The thinning of the casing of the position indicator can be realized while degradation in signals transmitted and received to and from the sensor of the position detecting device is prevented. In addition, in the case of the second embodiment, the ferrite core does not need to be provided with a through hole. Thus, the ferrite core is resistant to damage due to an impact when the position indicator falls, and can be made thinner (flatter).

[Third Embodiment]

In the foregoing first embodiment, as a method for detecting a pen pressure, the capacitance of the capacitor forming the resonance circuit is made variable. As a method of making the capacitance variable, a mechanistic constitution is adopted in which part of the pressure sensing parts 7 formed by a plurality of parts arranged in the axial direction are moved in the axial direction according to the pressure applied to the tip portion of the core body. However, the constitution in which the capacitance of the capacitor forming the resonance circuit is made variable is not limited to the above-described example. The pressure sensing parts can also be formed by a semiconductor device referred to as a so-called MEMS (micro electro mechanical system), for example. A position indicator according to a third embodiment uses the MEMS as a pressure sensing part.

Figure 10:
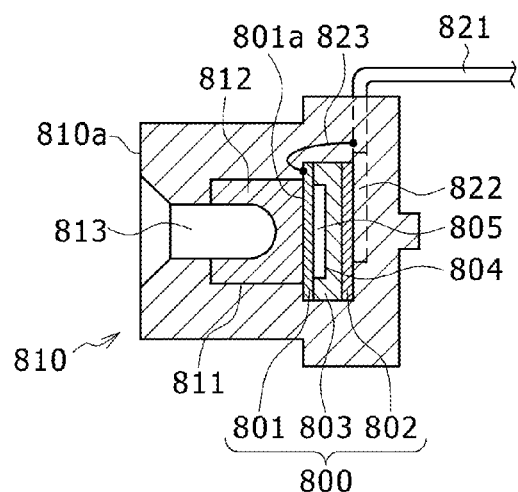
FIG. 10 is a sectional view of a third embodiment of the position indicator according to the present disclosure.

FIG. 10 is a sectional view of assistance in explaining an example of the pressure sensing part using the MEMS. Incidentally, the pressure sensing part will hereinafter be referred to as a capacitance type pressure sensing semiconductor device (hereinafter referred to as a pressure sensing device).

The pressure sensing device is for example formed by sealing a pressure sensing chip 800 formed as a semiconductor device manufactured by MEMS technology within a package 810 in the form of a box as a cube or a rectangular parallelepiped, for example. The pressure sensing chip 800 detects a pressure applied thereto as a change in capacitance.

The pressure sensing chip 800 in the present example has the shape of a rectangular parallelepiped with a longitudinal length and a lateral length of 1.5 mm and a height of 0.5 mm, for example. As shown in FIG. 10, the pressure sensing chip 800 in the present example includes a first electrode 801, a second electrode 802, and an insulating layer (dielectric layer) 803 between the first electrode 801 and the second electrode 802. The first electrode 801 and the second electrode 802 in the present example are formed by a conductor made of single crystal silicon (Si).

On the side of a surface of the insulating layer 803 which surface is opposed to the first electrode 801, a circular recessed portion 804 having a central position of the surface as a center is formed in the present example. This recessed portion 804 forms a space 805 between the insulating layer 803 and the first electrode 801.

In the pressure sensing chip 800 having the constitution as described above, a capacitance Cd is formed between the first electrode 801 and the second electrode 802. When a pressure is applied to the first electrode 801 from the side of an upper surface 801a of the first electrode 801 which upper surface is on the opposite side from the surface opposed to the second electrode 802, the first electrode 801 is bent to the side of the space 805, and a distance between the first electrode 801 and the second electrode 802 is shortened, so that the value of the capacitance Cd is changed so as to increase. An amount of bending of the first electrode 801 changes according to the magnitude of the applied pressure. Hence, the capacitance Cd is a variable capacitance that varies according to the magnitude of the pressure applied to the pressure sensing chip 800.

In the present example, a recessed portion 811 covers the area of the portion subjected to pressure in the pressure sensing chip 800 and is provided on the side of the surface 801a of the first electrode 801 subjected to pressure in the pressure sensing chip 800 of the package 810. An elastic member 812 is filled into the recessed portion 811. A communicating hole 813 communicating from an upper surface 810a to a portion of the elastic member 812 is formed in the package 810.

As shown in FIG. 10, a first lead terminal 821 connected to the first electrode 801 of the pressure sensing chip 800 is led out from the package 810 of the pressure sensing chip 800, and a second lead terminal 822 connected to the second electrode 802 of the pressure sensing chip 800 is led out from the package 810 of the pressure sensing chip 800. The first lead terminal 821 and the second lead terminal 822 are electrically connected, on a printed board, to a coil wound around a ferrite core so as to form a resonance circuit with the coil wound around the ferrite core.

The position indicator according to the third embodiment can adopt both forms of a constitution in which the pressure sensing device is disposed between the ferrite core and the tip portion of the core body and a constitution in which the pressure sensing device is disposed on an opposite side of the ferrite core from the tip portion of the core body.

In the former case of the position indicator in which the pressure sensing device is disposed between the ferrite core and the tip portion of the core body, the core body main body portion of the core body is inserted into the communicating hole 813 of the pressure sensing device, and is elastically retained by the elastic member 812. The capacitance of the pressure sensing chip 800 is thereby changed according to the pressure applied to the tip portion of the core body. In this case, a recessed hole for inserting the core body main body portion of the core body does not need to be formed in the ferrite core.

In the latter case of the position indicator in which the pressure sensing device is disposed on the opposite side of the ferrite core from the tip portion of the core body, a through hole is provided in the ferrite core as in the first embodiment in order to transmit the pressure applied to the tip portion of the core body to the pressure sensing device. In the case of the latter configuration, the core body main body portion of the core body is inserted through the through hole of the ferrite core, and thereafter inserted into the communicating hole 813 of the pressure sensing device to be elastically retained by the elastic member 812, so that the capacitance of the pressure sensing chip 800 is changed according to the pressure applied to the tip portion of the core body.

Incidentally, in the case of the position indicator having the latter configuration, the ferrite core can be formed without the through hole for inserting the core body main body portion of the core body. Specifically, as in the second embodiment, the core body is fitted into a recessed portion of the ferrite core via a pedestal member 45. Then, a projecting portion to be inserted into the communicating hole 813 of the pressure sensing device is formed on the opposite side of the ferrite core from the core body side in the axial direction. According to this configuration, the pressure applied to the tip portion of the core body is transmitted to the pressure sensing device via the ferrite core, whereby the capacitance of the pressure sensing device is changed. Thus, the pressure applied to the tip portion of the core body can be detected.

The position indicator according to the third embodiment described above also produces similar effects to those of the foregoing first embodiment and the foregoing second embodiment. The thinning of the casing of the position indicator can be realized while degradation in signals transmitted and received to and from the sensor of the position detecting device is prevented. In addition, the third embodiment uses a MEMS, which is a small semiconductor device, as a pressure sensing part. Thus, a plurality of parts such as the pressure sensing parts in the first embodiment and the second embodiment do not need to be used, and therefore the constitution can be simplified.

[Other Embodiments and Modifications]

The cross-sectional shapes of the ferrite cores 6 and 6B whose examples are shown in the foregoing first and second embodiments have the planes 61P and 62P in directions along the longitudinal direction of the flat shape, and have the curved surfaces 63C and 64C coupling the two planes 61P and 62P to each other. It is needless to say, however, that the ferrite core is not limited to such a shape.

Figure 11A:
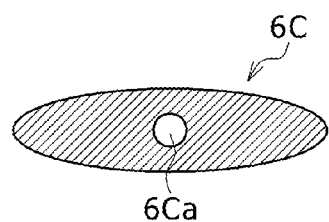
FIGS. 11(A) to 11(D) are cross-sectional views of ferrite cores that may be used as a principal part of a position indicator according to an embodiment of the present disclosure.

For example, FIGS. 11(A) to 11(D) show a few examples of a ferrite core having a through hole at the position of a central axis, which examples are applied to the first embodiment. A ferrite core 6C in the example of FIG. 11(A) is of a columnar shape having an elliptic cross-sectional shape. A through hole 6Ca is provided in the position of the central axis of the ferrite core 6C.

Figure 11B:
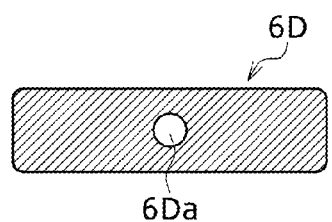

A ferrite core 6D in the example of FIG. 11(B) is of a columnar shape having a rectangular cross-sectional shape. A through hole 6Da is provided in the position of the central axis of the ferrite core 6D. When the rectangular cross-sectional shape of the columnar shape in the example of FIG. 11(B) has angular portions, a magnetic flux leakage from the angular portions becomes a problem. Thus, as in the example of FIG. 11(B), the four angular portions are formed into a curved surface shape, so that the angular portions are removed.

The cross-sectional shapes of the ferrite cores used in the foregoing embodiments are axisymmetric with respect to a straight line in the longitudinal direction which straight line passes through the position of the central axis in the cross section, and is axisymmetric with respect to a straight line in a direction orthogonal to the straight line in the longitudinal direction. It is needless to say, however, that the cross-sectional shape of the ferrite core is not limited to such a shape.

Figure 11C:
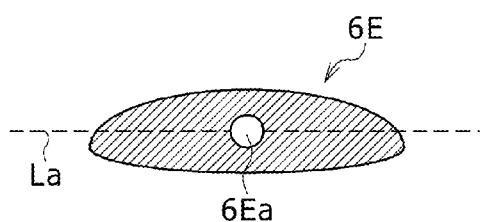
Figure 11D:
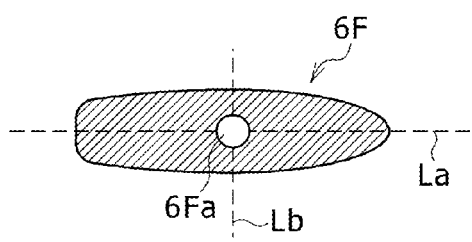

A ferrite core 6E in the example of FIG. 11(C) is asymmetric with respect to a straight line La in the longitudinal direction which straight line La passes through the position of the central axis in the cross section. A through hole 6Ea is provided in the position of the central axis of the ferrite core 6E. A ferrite core 6F in the example of FIG. 11(D) is asymmetric with respect to a straight line Lb in a direction orthogonal to the straight line La in the longitudinal direction which straight line Lb passes through the position of the central axis in the cross section. A through hole 6Fa is provided in the position of the central axis of the ferrite core 6F.

It is to be noted that the cross-sectional shape of the ferrite core is not limited to the examples cited in FIGS. 11(A) to 11(B), but can be various other shapes, of course.

It is to be noted that the magnetic cores in the foregoing embodiments are all a ferrite core, but are not limited to a ferrite core, of course.

DESCRIPTION OF REFERENCE SYMBOLS

1, 1B . . . Position indicator, 2 . . . Case, 2a . . . Case main body, 2b . . . Case cap, 4, 4B . . . Core body, 6, 6B, 6C, 6D, 6E, 6F . . . Ferrite core, 21, 21B . . . Opening portion, 41, 41B . . . Core body main body portion, 42, 42B . . . Tip portion, 43, 43B . . . Base portion, 7, 7B . . . Pressure sensing part

The invention claimed is:

1. A position indicator comprising:
   a cylindrical casing;
   a columnar magnetic core provided within the cylindrical casing with an axial direction of the casing as a direction of a central axis of the magnetic core;
   a coil wound so as to have the central axis of the columnar magnetic core as a center; and
   a core body provided so as to have a tip portion exposed to an outside from an opening formed on one end side in the axial direction of the cylindrical casing,
   wherein the magnetic core has a flat cross-sectional shape, the cross-sectional shape resulting from a cross section of the magnetic core taken in a direction perpendicular to the direction of the central axis of the magnetic core, and has a tapered portion formed on a side of the tip portion of the core body in the direction of the central axis of the magnetic core, the tapered portion being tapered off toward the tip portion of the core body, wherein the cross-sectional shape of the magnetic core is a noncircular shape at least partially having a curved surface.

2. The position indicator according to claim 1, wherein the magnetic core has a hole in the axial direction into which the core body is insertable, and the tapered portion has an inclination toward the hole in the axial direction.

3. The position indicator according to claim 2, wherein the hole in the axial direction of the magnetic core has a circular cross section, and an end surface of the magnetic core on the side of the tip portion of the core body in the direction of the central axis of the magnetic core has a shape of a circle concentric with the hole.

4. The position indicator according to claim 2, wherein the hole in the axial direction of the magnetic core is a through hole, a core body main body portion of the core body is connected to the tip portion of the core body, and is inserted through the through hole of the magnetic core, and a pressure sensing member receiving a pressure applied to the core body via the core body main body portion and sensing the pressure is provided on an opposite side from the tip portion of the core body in the direction of the central axis of the magnetic core.

5. The position indicator according to claim 1, wherein the cross-sectional shape of the magnetic core is an elliptic shape.

6. The position indicator according to claim 1, wherein the cross-sectional shape of the magnetic core is a shape having two parallel straight lines opposed to each other with a center point interposed between the two straight lines, and having curves connecting the two straight lines to each other.

7. The position indicator according to claim 6, wherein the tapered portion is formed at parts of the curves connecting the two straight lines to each other in the cross-sectional shape.

8. The position indicator according to claim 1, wherein the tapered portion is formed in the direction perpendicular to the direction of the central axis of the magnetic core.

9. A method of forming a position indicator, the method comprising:

providing a columnar magnetic core within a cylindrical casing with an axial direction of the casing as a direction of a central axis of the magnetic core;

winding a coil so as to have the central axis of the columnar magnetic core as a center; and providing a core body so as to have a tip portion exposed to an outside from an opening formed on one end side in the axial direction of the cylindrical casing, wherein the magnetic core has a flat cross-sectional shape, the cross-sectional shape resulting from a cross section of the magnetic core taken in a direction perpendicular to the direction of the central axis of the magnetic core, and has a tapered portion formed on a side of the tip portion of the core body in the direction of the central axis of the magnetic core, the tapered portion being tapered off toward the tip portion of the core body, wherein the cross-sectional shape of the magnetic core is a noncircular shape at least partially having a curved surface.

10. The method according to claim 9, wherein the magnetic core has a hole in the axial direction into which the core body is insertable, and the tapered portion has an inclination toward the hole in the axial direction.

11. The method according to claim 10, wherein the hole in the axial direction of the magnetic core has a circular cross section, and an end surface of the magnetic core on the side of the tip portion of the core body in the direction of the central axis of the magnetic core has a shape of a circle concentric with the hole.

12. The method according to claim 10, wherein the hole in the axial direction of the magnetic core is a through hole, the method further comprising:

connecting a core body main body portion of the core body to the tip portion of the core body;

inserting the core body through the through hole of the magnetic core, and providing a pressure sensing member receiving a pressure applied to the core body via the core body main body portion and sensing the pressure on an opposite side from the tip portion of the core body in the direction of the central axis of the magnetic core.

13. The method according to claim 9, wherein the cross-sectional shape of the magnetic core is an elliptic shape.

14. The method according to claim 9, wherein the cross-sectional shape of the magnetic core is a shape having two parallel straight lines opposed to each other with a center point interposed between the two straight lines, and having curves connecting the two straight lines to each other.

15. The method according to claim 14, wherein the tapered portion is formed at parts of the curves connecting the two straight lines to each other in the cross-sectional shape.

16. The method according to claim 9, wherein the tapered portion is formed in the direction perpendicular to the direction of the central axis of the magnetic core.

* * * * *